(12) United States Patent
Yuratich

(10) Patent No.: US 7,701,106 B2
(45) Date of Patent: Apr. 20, 2010

(54) ELECTRIC SUBMERSIBLE PUMPS

(75) Inventor: Michael Andrew Yuratich, Hamble (GB)

(73) Assignee: Oilfield Equipment Development Center Limited, Victoria, Mahe (SC)

( * ) Notice: Subject to any disclaimer, the term of this patent is extended or adjusted under 35 U.S.C. 154(b) by 312 days.

(21) Appl. No.: 10/562,073

(22) PCT Filed: Jun. 21, 2004

(86) PCT No.: PCT/GB2004/002668

§ 371 (c)(1),
(2), (4) Date: Dec. 21, 2005

(87) PCT Pub. No.: WO2004/114498

PCT Pub. Date: Dec. 29, 2004

(65) Prior Publication Data

US 2007/0096571 A1 May 3, 2007

(30) Foreign Application Priority Data

Jun. 21, 2003 (GB) ................................. 0314555.4

(51) Int. Cl.
*H02K 3/46* (2006.01)
(52) U.S. Cl. .................... 310/216.069; 310/64; 310/214
(58) Field of Classification Search ......... 310/214–218, 310/198, 52–64, 216.069
See application file for complete search history.

(56) References Cited

U.S. PATENT DOCUMENTS

| | | | |
|---|---|---|---|
| 2,233,890 A * | 3/1941 | Hoover | ............................ 174/8 |
| 2,607,816 A | 8/1952 | Ryder et al. | |
| 3,077,572 A | 2/1963 | Zimmerman, Jr. | |
| 3,334,252 A * | 8/1967 | Gayral | ........................ 310/214 |
| 3,568,771 A | 3/1971 | Vincent et al. | |

(Continued)

FOREIGN PATENT DOCUMENTS

CA        2 326 807        10/1999

(Continued)

OTHER PUBLICATIONS

GB Search Report, Application No. 0600376.8, Dated Mar. 5, 2007.

(Continued)

*Primary Examiner*—Dang D Le
(74) *Attorney, Agent, or Firm*—Patterson & Sheridan, L.L.P.

(57) ABSTRACT

A downhole electric motor for a submersible pump has at least three phases and comprises a permanent magnet rotor and a stator bearing phase windings A, B and C in slots (2206) in the stator. Each phase winding A, B, C incorporates a coil extending through a respective pair of adjacent stator slots (2206) and surrounds a respective portion of the stator between the slots (2206). Furthermore adjacent coils of each pair of phase windings A, B, C extend through opposite parts of a respective one of the slots (2206), so that these coils extend alongside one another in the slot, either being separated by a gap through which cooling fluid may be pumped to cool the coils, or being separated by a thermally conductive projection (3110), with which the coils are in thermal contact, extending at least part of the way across the slot. Such a winding arrangement is advantageous in ensuring that the motor has a long life.

9 Claims, 24 Drawing Sheets

U.S. PATENT DOCUMENTS

| | | | |
|---|---|---|---|
| 4,310,211 A | 1/1982 | Bunnell et al. | |
| 4,330,740 A | 5/1982 | Shell et al. | |
| 4,434,389 A | 2/1984 | Langley et al. | |
| 4,477,967 A | 10/1984 | Yabuoshi et al. | |
| 4,623,830 A | 11/1986 | Peneder et al. | |
| 4,643,506 A | 2/1987 | Kobler | |
| 5,207,273 A | 5/1993 | Cates et al. | |
| 5,580,282 A | 12/1996 | Paterek | |
| 5,866,966 A * | 2/1999 | Fulton | 310/214 |
| 5,923,111 A | 7/1999 | Eno et al. | |
| 5,929,549 A * | 7/1999 | Trago et al. | 310/198 |
| 5,998,903 A * | 12/1999 | Umeda et al. | 310/179 |
| 6,000,915 A | 12/1999 | Hartman | |
| 6,047,461 A | 4/2000 | Miura et al. | |
| 6,193,474 B1 | 2/2001 | Tetzlaff | |
| 6,254,353 B1 | 7/2001 | Polo et al. | |
| 6,318,467 B1 | 11/2001 | Liu et al. | |
| 6,388,353 B1 | 5/2002 | Liu et al. | |
| 6,621,005 B1 | 9/2003 | Lovec et al. | |
| 6,700,283 B2 * | 3/2004 | Kikuchi et al. | 310/214 |
| 6,914,356 B2 * | 7/2005 | Yamamura et al. | 310/71 |
| 2002/0057031 A1 | 5/2002 | Ueda et al. | |
| 2002/0063488 A1 | 5/2002 | Ooiwa | |
| 2002/0066568 A1 | 6/2002 | Buchanna et al. | |
| 2003/0116323 A1 | 6/2003 | Pettigrew | |
| 2003/0193260 A1 | 10/2003 | Reiter et al. | |
| 2003/0214196 A1 | 11/2003 | Cai et al. | |
| 2005/0057106 A1 * | 3/2005 | Allen et al. | 310/54 |

FOREIGN PATENT DOCUMENTS

| | | |
|---|---|---|
| DE | 1004892 | 3/1957 |
| DE | 28 26 607 | 11/1979 |
| DE | 3907516 | 9/1990 |
| DE | 102 07 310 | 9/2003 |
| EP | 0 342 554 | 11/1989 |
| EP | 0 644 645 | 3/1995 |
| EP | 0986161 | 3/2000 |
| EP | 1 102 383 | 5/2001 |
| EP | 1107433 | 6/2001 |
| EP | 1422806 | 5/2004 |
| EP | 1742327 | 1/2007 |
| GB | 393466 | 6/1933 |
| GB | 537833 | 7/1941 |
| GB | 545101 | 5/1942 |
| GB | 1 304 204 | 1/1973 |
| GB | 2 003 333 | 8/1977 |
| GB | 2 052 319 | 1/1981 |
| GB | 1062096 | 3/1987 |
| GB | 2 210 733 | 6/1989 |
| GB | 2248524 | 4/1992 |
| GB | 2 256 094 | 11/1992 |
| GB | 2264811 | 9/1993 |
| GB | 2 302 892 | 2/1997 |
| GB | 2 362 762 | 11/2001 |
| GB | 2 362 901 | 12/2001 |
| GB | 2 391 395 | 2/2004 |
| JP | 07-201404 | 8/1995 |
| JP | 9215230 | 8/1997 |
| JP | 2001054244 | 2/2001 |
| JP | 2001-161039 | 6/2001 |
| JP | 2002027688 | 1/2002 |
| JP | 2002-78258 | 3/2002 |
| JP | 2002345184 | 11/2002 |
| JP | 2003-3985 | 1/2003 |
| JP | 2003173839 | 6/2003 |
| JP | 2003217697 | 7/2003 |
| JP | 2004343856 | 12/2004 |
| KR | 20050066006 | 6/2005 |
| WO | WO 84/03400 | 8/1984 |
| WO | WO 97/33070 | 9/1997 |
| WO | WO 2004/021548 | 3/2004 |

OTHER PUBLICATIONS

GB Search Report, Application No. 0600376.8, Dated Mar. 1, 2007.
GB Search Report, Application No. 0600376.8, Dated Oct. 20, 2006.
Canadian Office Action, Application No. 2,530,162, dated Jul. 31, 2007.
Search Report dated Mar. 3, 2005 from the British Patent Office for British Application No. 0426585.6.
Search Report dated Nov. 20, 2003 from the British Patent Office for British Application No. 0314553.9.
Search Report dated Mar. 2, 2004 from the British Patent Office for British Application No. 0314553.9.
Search Report dated Mar. 2, 2004 from the British Patent Office for British Application No. 0314553.9.
Search Report dated Mar. 2, 2004 from the British Patent Office for British Application No. 0314553.9.
Search Report dated Apr. 8, 2004 from the British Patent Office for British Application No. 0314550.5.
Search Report dated Apr. 22, 2004 from the British Patent Office for British Application No. 0314555.4.
International Search Report dated Jan. 19, 2005 from the European Patent Office for International Application No. PCT/GB2004/002663.
International Search Report dated Dec. 29, 2004 from the European Patent Office for International Application No. PCT/GB2004/002668.
International Search Report dated Feb. 8, 2005 from the European Patent Office for International Application No. PCT/GB2004/002667.
Sung-Jun Kim, et al., "A novel filter design for suppression of high voltage gradient in voltage-fed PWM inverter," APEC '97 Conference, Feb. 23, 1997, 122-127, XP010215809.

* cited by examiner

409

Figure 17
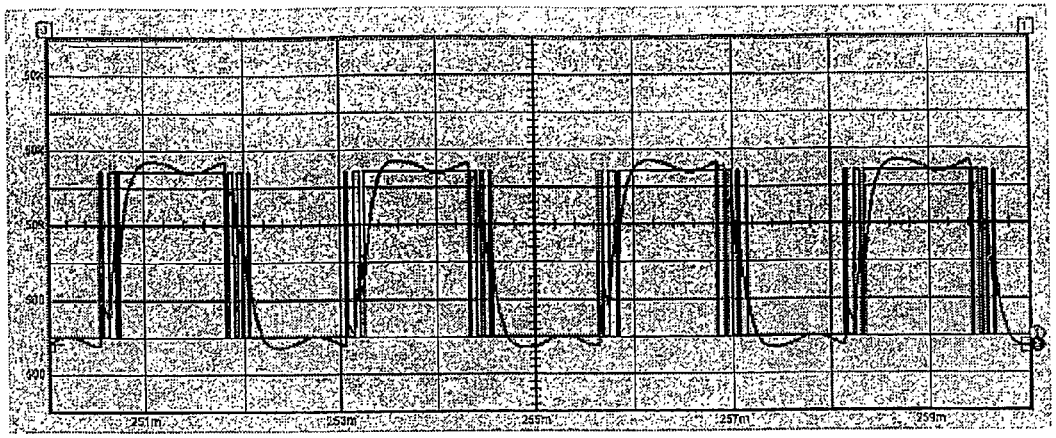
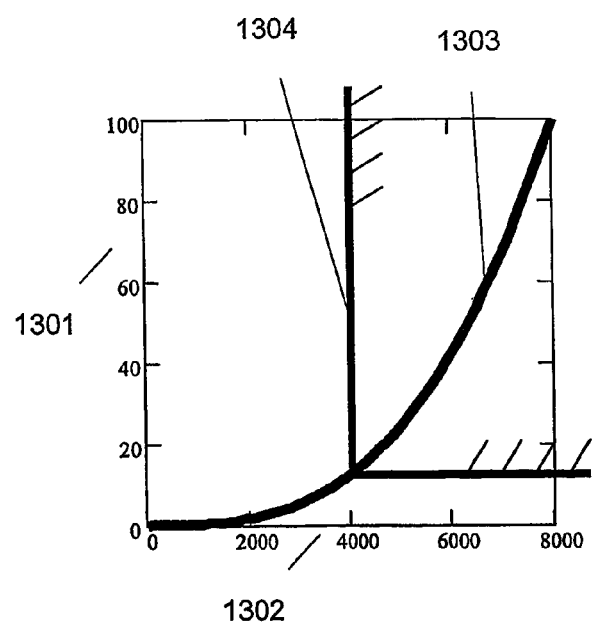
Figure 18

Figure 22
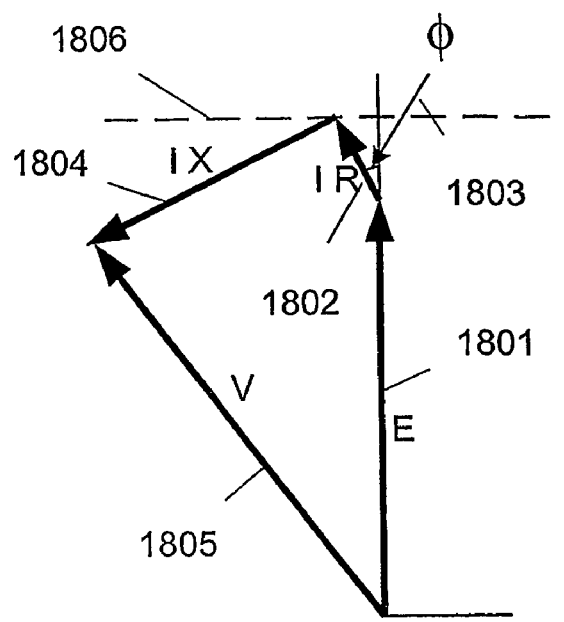
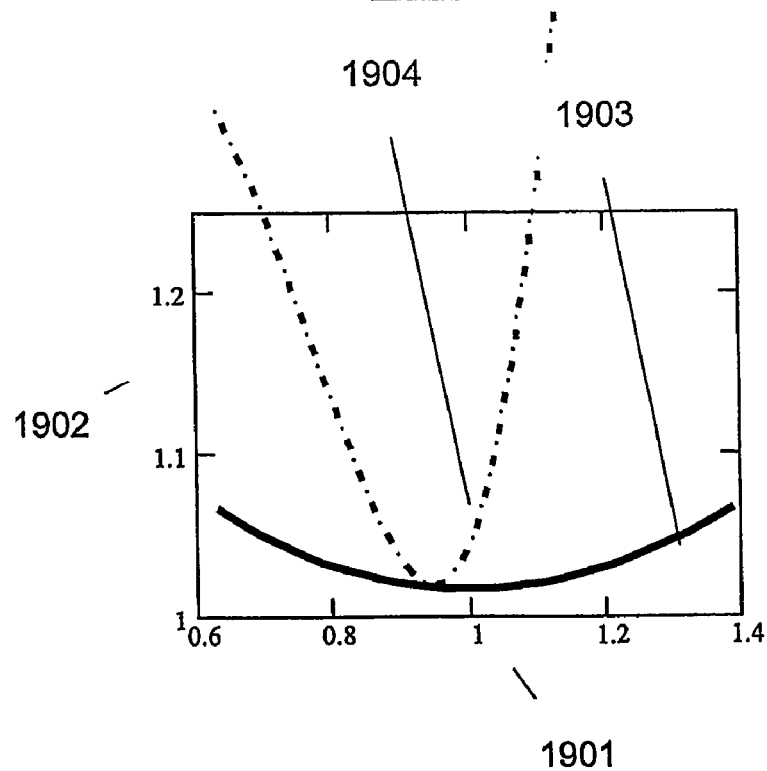
Figure 23

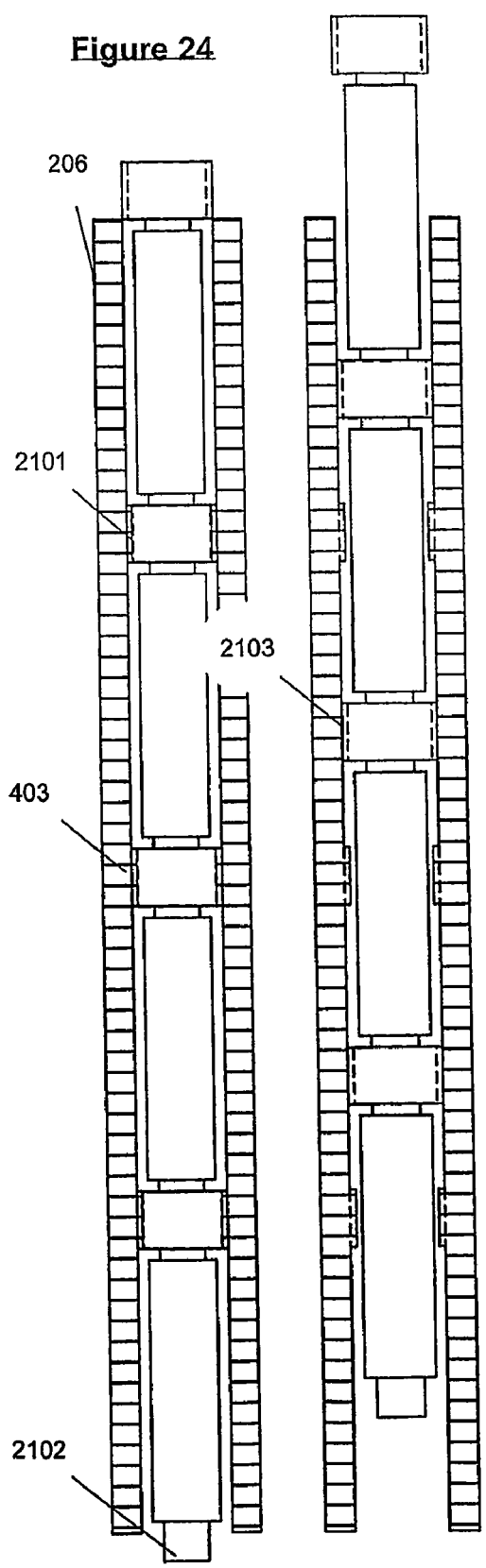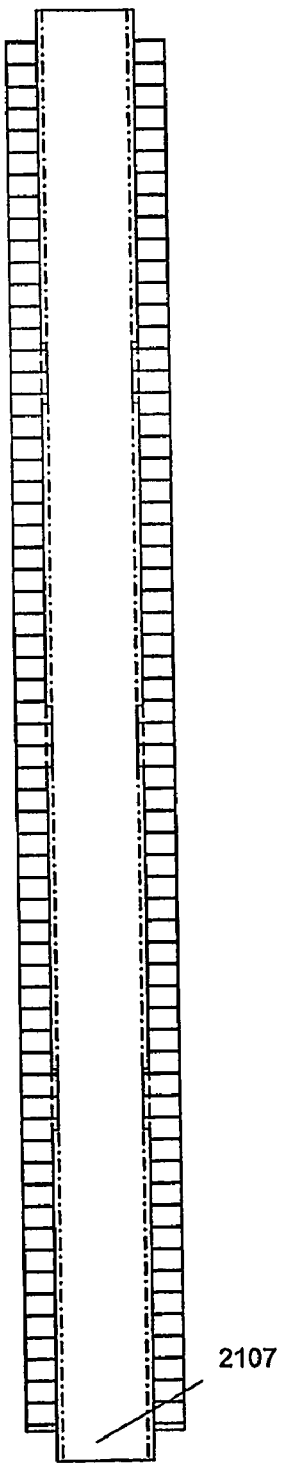

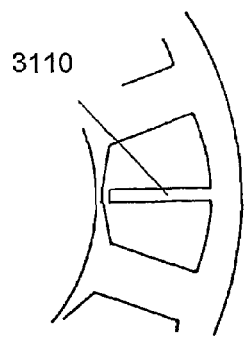
Figure 31A
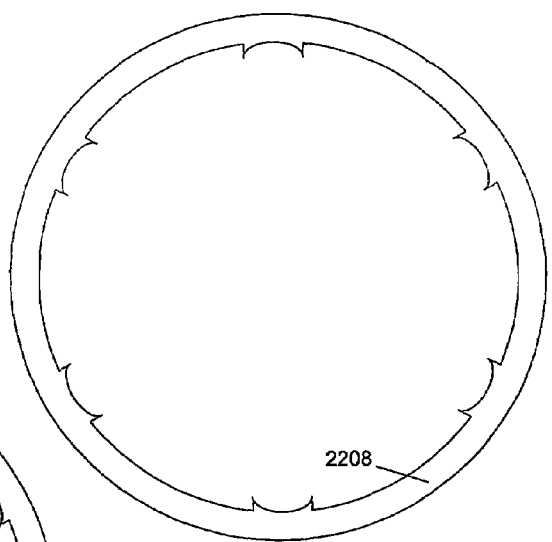
Figure 32
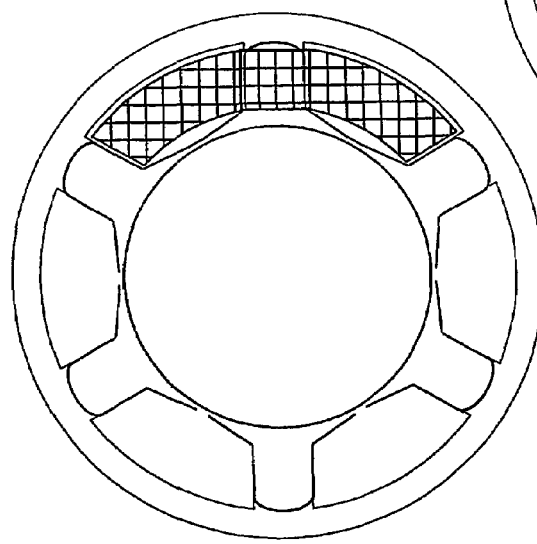
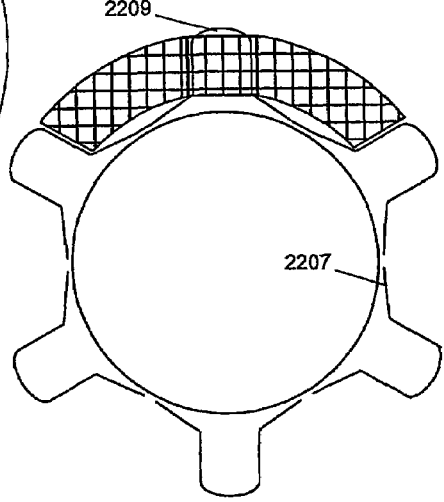

ELECTRIC SUBMERSIBLE PUMPS

This invention relates to motors and electronic drives for electric submersible pumps and compressors, and is concerned more, but not exclusively, with centrifugal pumps.

Submersible pumping is a well-established technique for extracting hydrocarbons from deep boreholes, where the natural pressure in the reservoir is insufficient to lift the fluid or gas to surface. The technique is also used in water production.

Typically the production requirement is to lift large volumes of liquid against a pressure difference related to the depth of the well in which the pump is installed. For very heavy crude oils, slow-speed positive displacement pumps are suitable. These are usually rotated by a motor at the surface connected to the pump by a long flexible rod system. Centrifugal pumps have been found most suitable for normal crude oils, gas and water. These pumps are rotated by a submerged motor connected directly to the pump, with electric power being delivered from the surface by a long cable. Also, the use of electric cables makes installation possible in deep or long horizontal wells which would otherwise not be possible with the use of rotating rods.

The electric motors used for driving the centrifugal pumps are very elongated, sometimes of a length of more than one hundred times their diameter. The resulting complexity of such a device, the difficulty of its manufacture and the quantity of the degradable insulation materials it employs all reduce the system reliability.

Electric motor shaft power output is defined as the product of rotation speed and torque. For a given physical size and type of motor there is a limit to the level of torque that can be produced, typically due to self-heating. A high-speed motor therefore provides a means for obtaining more power from the same length of motor, or the same power from a shorter length.

The output of a pump is normally given in terms of its hydraulic power, which is the product of flow rate and lifting pressure (in rationalised units). Centrifugal pump technology is characterised by the power output being proportional to the cube of the rotational speed. This known relationship, sometimes termed the "affinity law", means that a relatively small increase in the rotational speed can give rise to a substantial power increase.

Centrifugal pumps are frequently made with hundreds of impellers threaded on a common shaft, each impeller adding a little to the lifting pressure. Reducing the number of impellers by increasing the speed would therefore afford an improvement in reliability.

The above demonstrates that a high-speed motor and pump would, by being shorter for a given power, present direct advantages in reliability due to reduced complexity, or alternatively yield a higher output for a similar size. A large proportion of boreholes are deviated from the vertical and commonly even to the horizontal. A much shorter motor/pump combination would also lead to a reduction in damage caused by mishandling and bending during deployment through the curved sections of the borehole. Furthermore, the much-shortened length would allow motor/pump combinations to be assembled and tested in ideal conditions at the manufacturer's plant prior to being transported to the borehole location.

As will be described more fully below, innate limitations in the established motor and motor controller technology used in the electric submersible pumping industry have prevented the objective of higher speed being recognised or addressed.

Historically, electric submersible motors used for centrifugal pumping have been of the asynchronous, or induction, type. The stator is made of steel laminations and copper windings, and the rotor of steel laminations with copper bars forming the winding known as a squirrel cage. The rotor laminations are keyed to a shaft, this shaft providing the means of transmitting output torque. The rotor poles are produced by induction or transformer action between the stator and the rotor, using a portion of the stator current. The stator, in addition, produces a rotating stator field due to the alternating current in its windings. Since the transformer coupling to the rotor requires an alternating field in the rotor, the rotor must turn at a different (lower) speed than synchronous speed, producing a so-called slip frequency for induction. Electric submersible motors are made with two poles in order to achieve the maximum rotating speed from a standard 60 Hz utility supply. This speed is typically 3500 rpm, slightly less than the unattainable synchronous speed of 60 Hz×1 pole pair×60 s/min=3600 rpm.

It has become common to use variable speed drives to power these motors, rather than direct connection to the utility supply. Variable speed drives first convert utility AC power, typically at 60 Hz, to DC, and then by electronic switching convert the DC to a variable frequency alternating voltage. The use of a variable speed drive confers advantages during starting when it can limit the motor current to a safe level, and during production when it can be used to manage flow rates. The latter is important when the changing characteristics of a reservoir are considered over its producing life. Although variable speed drives, by creating an artificial supply of 70 Hz or more, can operate the motor at higher speed than when directly connected to the utility supply, this is a limited capability. Firstly the elongated induction motor is not suited to high-speed operations due to internal losses and small mechanical clearances, and secondly at the medium voltages used (often several thousand volts rms) drive losses become very high. Performance is generally limited up to 80 Hz or about 4500 rpm.

In order to maximise the induced rotor pole strength it is necessary to minimise the gap between the rotor and the stator. Unless very hot, the oil in the gap is sheared by the rotor turning yet remains in laminar flow. As a result the friction absorbs several percent of motor power. Motor efficiencies above 90% are sought, and this is an important source of loss in existing motors. The internal heating caused by these losses, and the copper losses in the squirrel cage, reduce motor life by aging the insulation materials.

The small gap is also a cause of premature failure due to mechanical causes. The limited diameter of boreholes is a natural disadvantage to both motors and pumps, and as a result their design is very elongated. A pump and induction motor assembly for producing 250 HP may be 20 meters long. This slender assembly is difficult to handle and particularly subject to damage when being deployed into deviated or horizontal wells, since small deflections of the motor housing can cause the rotor to impact on the stator. Rotor vibration due to bearing wear or imbalance also increases the chance of rotor impact.

The requirement for the rotor to be made of laminations and the limited overall motor diameter act together to constrain the diameter of the inner torque-carrying shaft. It is common practice, for example, to couple two 250 HP motors of 5.62 inch diameter together so as to make a longer 500 HP motor. Shaft strength limitation prevents this being increased to 750 HP or 1000 HP.

To provide a high-speed electric pumping system, it is desirable to increase the rotor clearance, and to reduce the internal sources of power loss that increase with speed. It is also necessary to use a drive technology which remains efficient at high speed and at the different operating voltage levels needed for different motor speeds required during the life of the well.

A further requirement of any high or low speed electric submersible system using variable speed drives is to minimise the deleterious effects of the electrical switching used to produce the alternating output voltages. Switching events on the long cables used in submersible cable propagate as wave fronts that reflect at connections and most particularly at the motor terminals. These reflections cause voltage transients that can approach twice the original voltage, and hence destroy insulation to earth. Commonly the motor voltage is presumed to be proportionally distributed through the turns of the stator winding, and the inter-turn insulation is less than that of the winding to earth. However a wave front impinging on a motor terminal must travel through the winding turn by turn before settling to its final value. Therefore there are short periods in which one turn of a winding carries the wave front at full voltage and an adjacent turn is unexcited. This internal voltage difference can exceed the inter-turn insulation rating, again causing premature failure. Increasing the insulation level to overcome these problems reduces the space available for the copper in the winding and also reduces the heat transfer from the copper, so that the motor specification is reduced.

An associated consideration for transients is the interference caused to data transmission systems used to convey data from instrumentation located in the well bore.

The foregoing has emphasised high-speed centrifugal pumping systems. However the same principles of reliable motor performance, matching efficient drives and circumventing the effects of transients on long cables are all applicable to positive displacement pumping systems.

Positive displacement pumps have a flow rate essentially determined by a characteristic volume per revolution multiplied by rotation speed. The torque demand at the pump shaft is determined by the back-pressure of the fluid column being lifted. These pumps usually operate at low speeds of a few hundred revolutions per minute. Since shaft power is the product of rotation speed and torque, it follows that these pumps are also characterised by extremely high torque demand. Where there is sand production with the pumped fluid and where the wells are deviated or horizontal, the rod connection to the surface has a very short working life. In these cases it is desirable to use a downhole motor with the positive displacement pump.

However, induction motors are inherently unsuited to low speed and high torque (although variable speed drives have improved their capabilities in this regard). Thus current installations rely on a gearbox to match the normal motor running speed and torque to the pump characteristics. This is also problematic as it is extremely difficult to make a reliable high torque gearbox in the small borehole diameter, and it is also expensive.

A motor having high torque at any speed including low speed is therefore preferable.

It is an object of the invention to provide an efficient electric submersible pump, comprising a reliable electric submersible motor capable of operating at low, medium and high speeds, and overcoming many of the above-described disadvantages of existing motors.

It is a yet further objective of the present invention to provide a high power electrical submersible pumping system of the order of half the length of conventional equipment.

According to one aspect of the present invention, there is provided downhole electric motor having at least three phases and comprising a permanent magnet rotor and a stator bearing phase windings in slots in the stator, each phase winding incorporating a plurality of coils each extending through a respective pair of closed stator slots and surrounding a respective portion of the stator between said stator slots, and adjacent coils of different phases extending through opposite parts of a respective one of the stator slots.

According to another aspect of the present invention, there is provided a downhole electric motor having a rotor and a stator bearing phase windings in slots in the stator, the stator being made up of first and second concentric parts which together define the slots in the stator so as to permit the phase windings to be fitted to the first part prior to fitting of the second part to enclose the phase windings within the slots.

Preferably a projection is provided on one of the concentric parts for extending at least part of the way across one of the slots to separate adjacent windings within the slot.

Conveniently the slots are substantially shaped to conform to the cross-section of the phase windings in order to provide close thermal contact and mechanical support between the phase windings and the surrounding material of the stator.

In one embodiment of the invention at least one of the concentric parts comprises a preassembled stack of laminations to which the other of the concentric parts is fitted to enclose the phase windings within the slots.

In an alternative embodiment of the invention at least one of the concentric parts is cast from insulated ferromagnetic powder and is fitted to the other of the concentric parts to enclose the phase windings within the slots.

The invention also provides a method of constructing a downhole electric motor having a rotor and a stator bearing phase windings in slots in the stator, the method comprising the steps of fitting phase windings to a first part of the stator, and combining the first part with a second part of the stator concentric with the first part so as to enclose the windings within slots, a projection on one of the concentric parts extending at least part of the way across one of the slots to separate adjacent windings within the slot when the first part is combined with the second part.

The invention also provides a method of constructing a downhole electric motor having a rotor and a stator bearing phase windings in slots in the stator, the method comprising the steps of fitting phase windings preassembled with an outer layer of insulating material to a first part of the stator, and combining the first part with a second part of the stator concentric with the first part so as to enclose the windings within slots with the outer layer of insulating material serving to insulate the windings from the surrounding material of the stator.

The invention also provides a downhole electric motor having a first multiple-phase section and a second multiple-phase section and separate supply leads for supplying said first and second sections with electrical power from the surface.

The invention also provides a method of constructing a downhole electric motor having a rotor and a stator bearing phase coils in slots in the stator, the method comprising the steps of fitting open ended conductive loops within the slots in the stator, and closing the conductive loops to form the phase coils.

The invention also provides a permanent magnet motor having a rotor provided with permanent magnet means, and a stator coaxial with the rotor, wherein the permanent magnet means is provided with an anti-corrosion coating.

For a better understanding of the present invention and in order to show how the same may be carried into effect, reference will now be made, by way of example, to the accompanying drawings, in which:

FIG. 1 schematically illustrates an electric submersible pumping system;

FIG. 17 shows representative waveforms of the variable speed drive of FIG. 12 incorporating practical switches when a high-speed motor is driven and a variable output voltage or current is required;

FIG. 18 shows the known idealised characteristics of positive displacement pumps and centrifugal pumps, turbines and fans;

FIG. 22 illustrates a known phasor diagram for the interpretation of the operation of an idealised permanent magnet synchronous motor according to FIG. 10;

FIG. 23 illustrates a means of optimisation of the control of a permanent magnet synchronous motor by varying the variable speed drive output voltage in accordance with the invention;

FIG. 24 illustrates a means of rotor assembly of an elongated permanent magnet motor in a final position;

FIG. 25 shows a means of rotor assembly of an elongated permanent magnet motor in an intermediate position;

FIG. 26 shows a means of stator assembly of an elongated permanent magnet motor;

Figure 33:
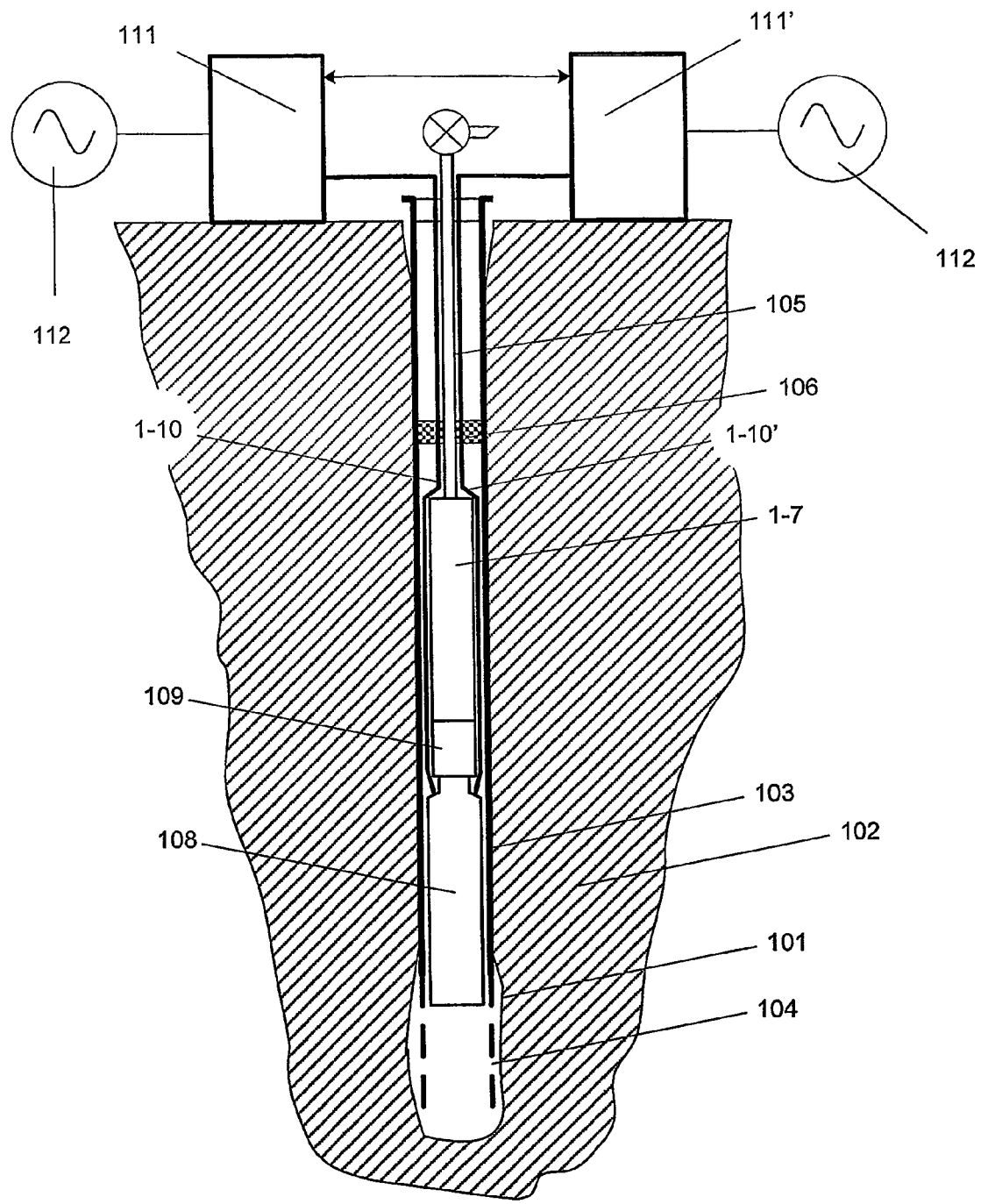
Figure 34:
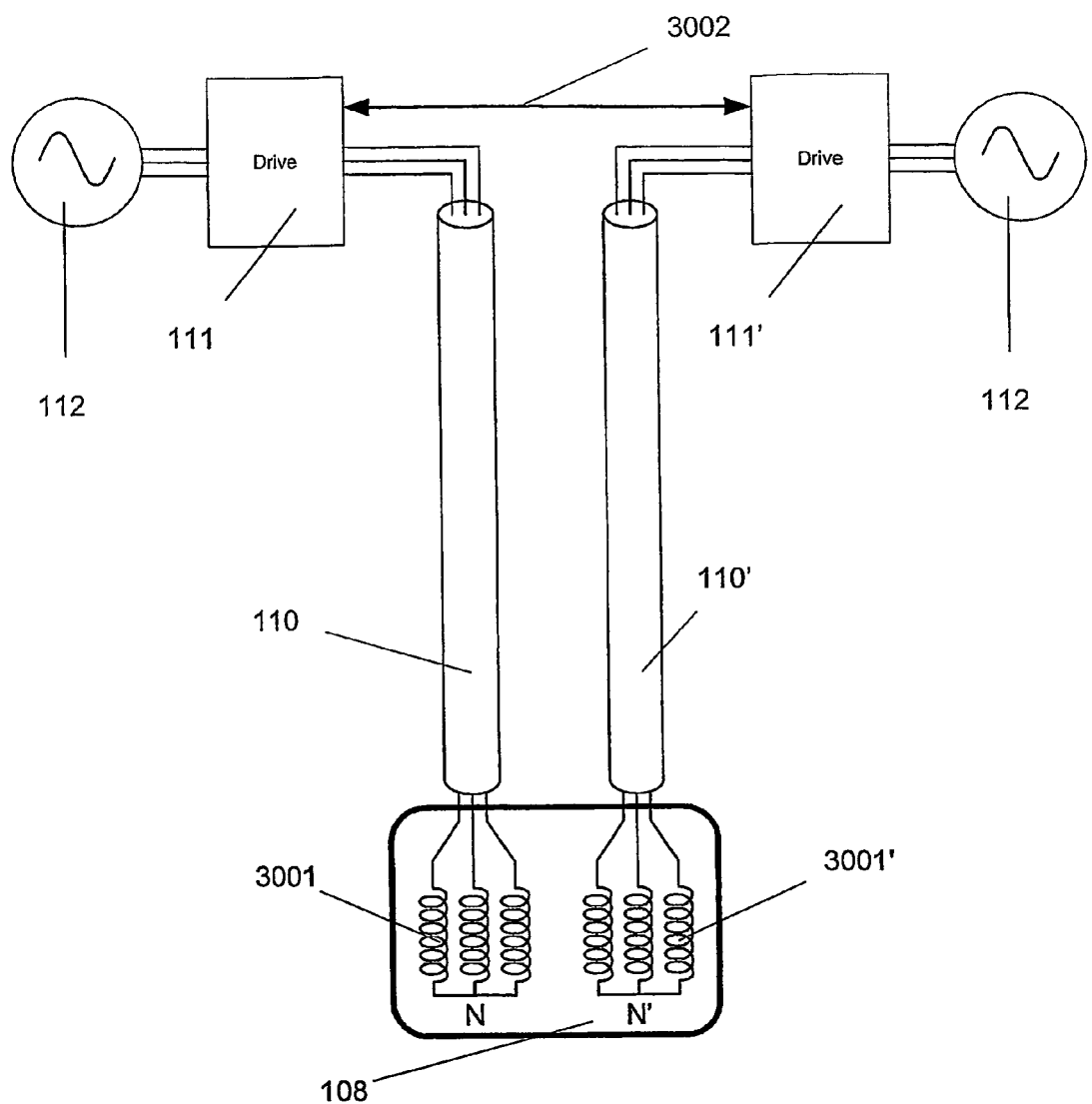
Figure 35:
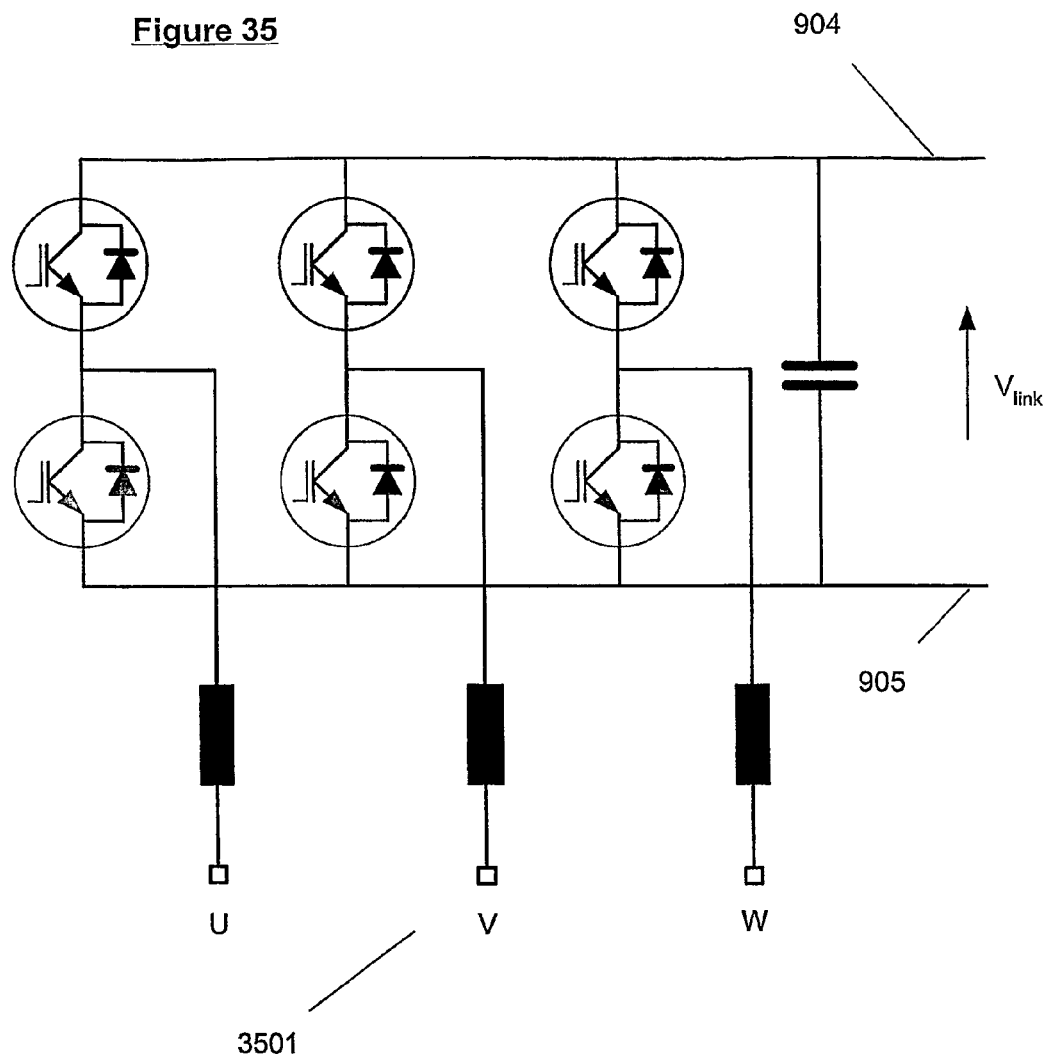
Figure 36:
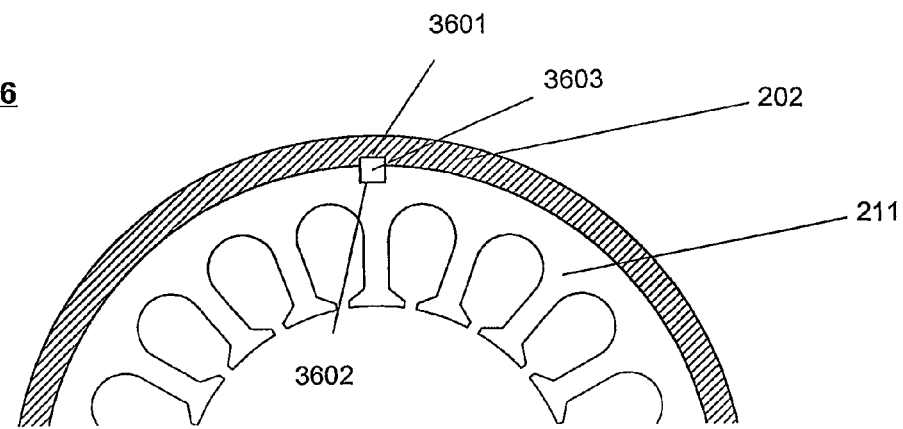
Figure 37:
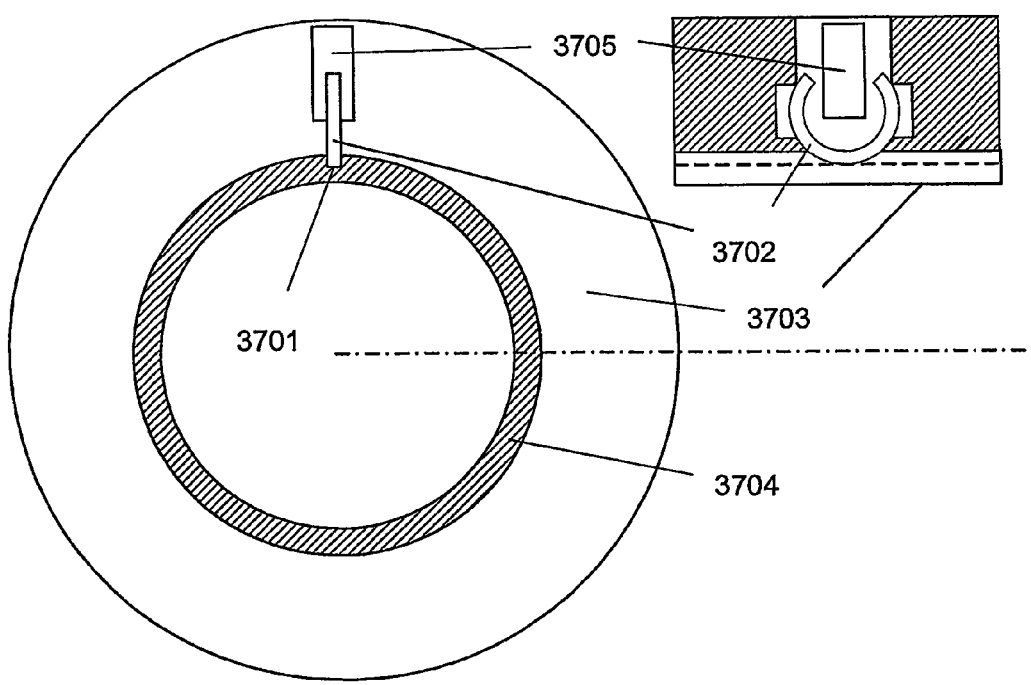
Figure 38:
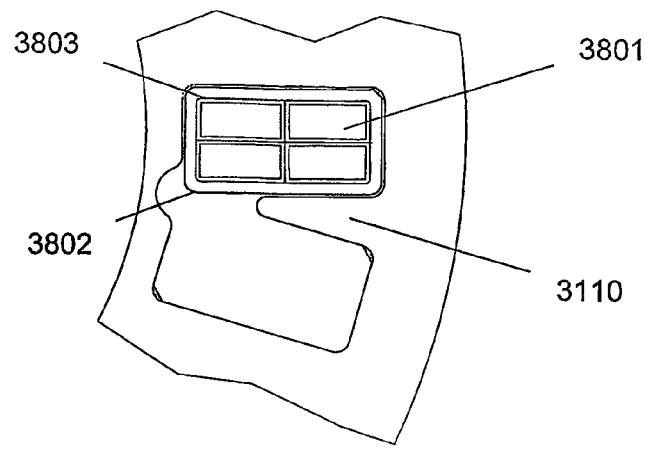
Figure 39A:
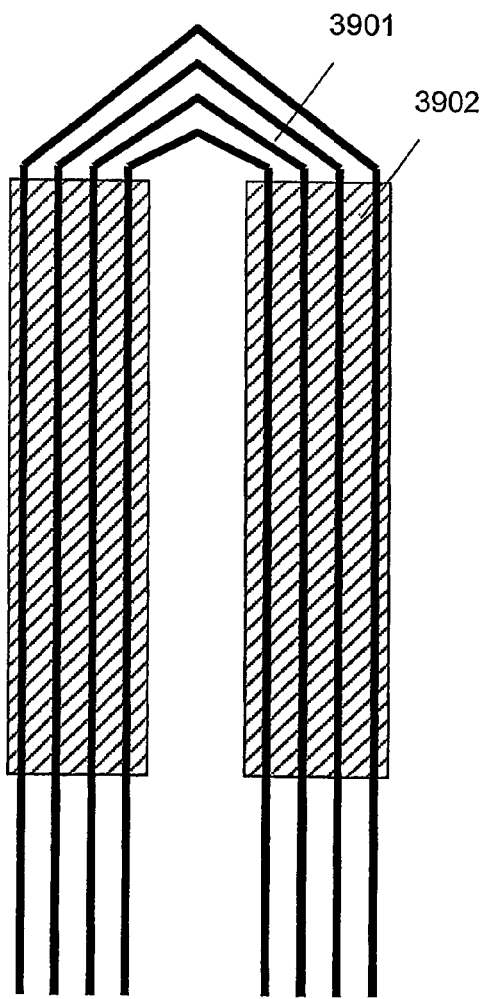
Figure 39B:
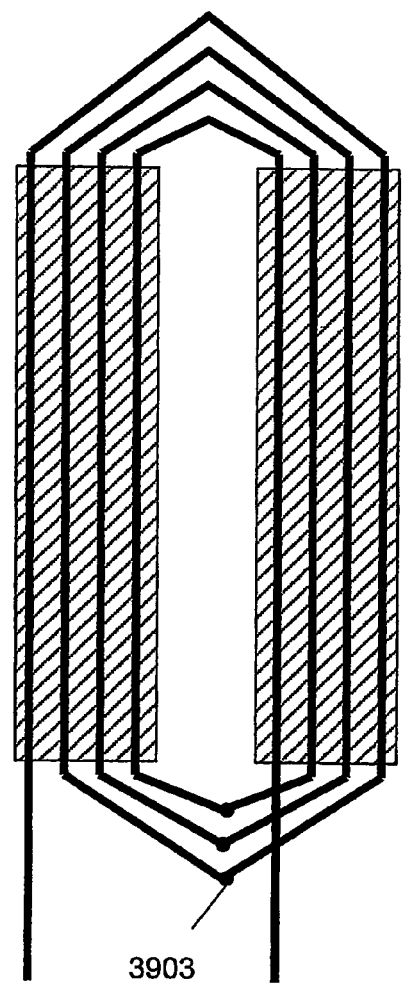

FIG. 32 schematically illustrates the assembly of such a stator assembly;

FIG. 33 schematically illustrates an improved pumping system according to the present invention;

FIG. 34 illustrates a motor for the pumping system of FIG. 33;

FIG. 35 shows a further electrical circuit diagram for the output stage of a variable speed drive;

FIG. 36 shows an axial key between the stator and the housing for use in a motor of the present invention;

FIG. 37 shows a bearing outer ring suitable for use in a motor of the present invention;

FIG. 38 shows a cross-section through a coil suitable for use in a motor of the present invention; and FIGS. 39a and 39b illustrate a possible means of forming a coil in such a motor.

Figure 1:
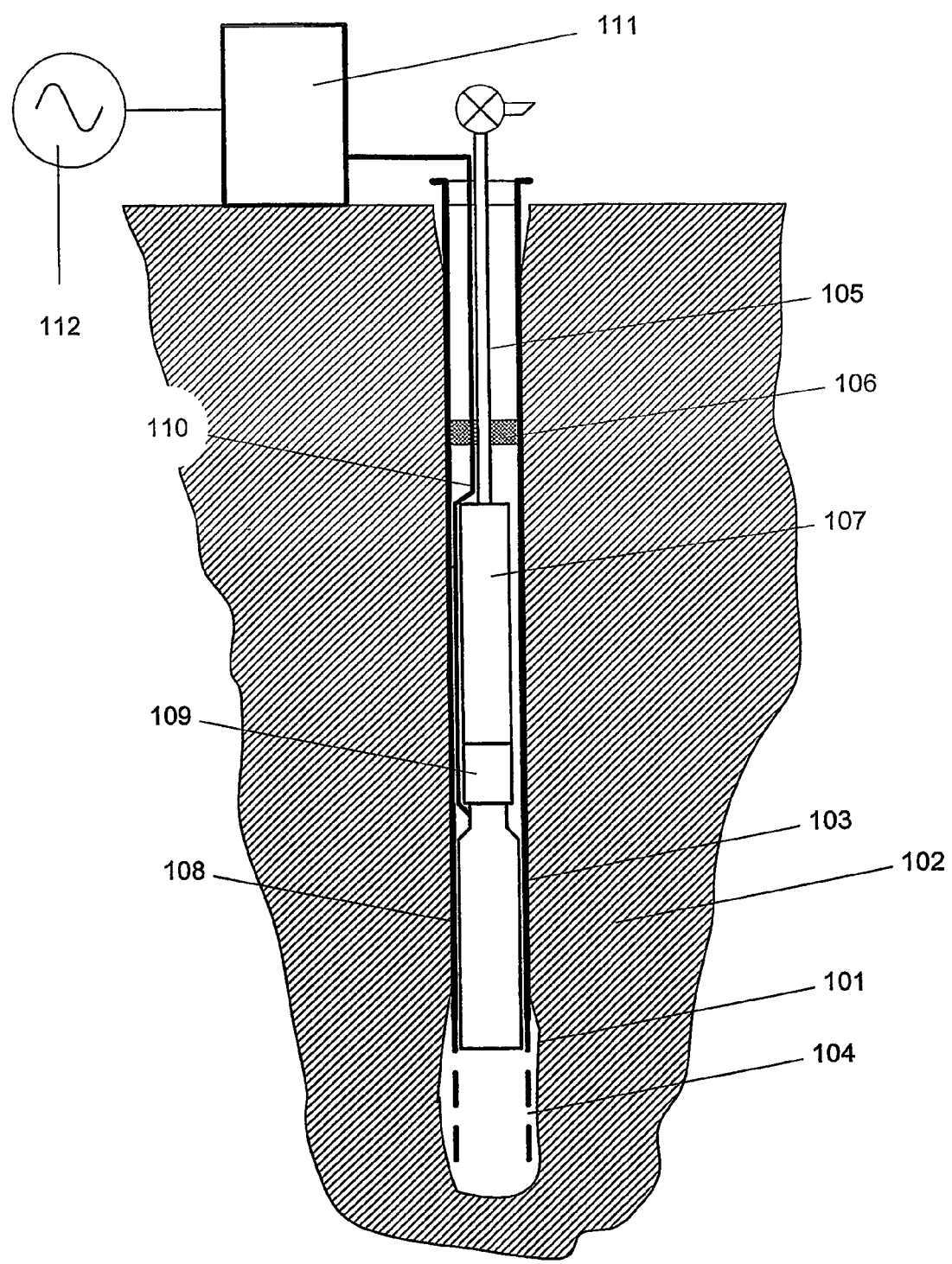
FIG. 1A is a block diagram of a variable speed drive.

With reference to FIG. 1, a representative installation of an electric submersible pump (ESP) is shown. A borehole 101 drilled in the earth is sealed with respect to the earth from the surface to below a reservoir 102 with casing 103. The casing 103 is perforated at 104 to allow reservoir fluid to enter the well. A pump 107 is provided to lift fluid from the well up tubing 105 to the surface. The tubing 105 is sealed to the casing 103 by packing 106 so that the reservoir fluid must go through the pump to reach surface. A permanent magnet submersible motor 108 (PMSM) is mounted beneath the pump 107. The connecting shaft of the motor 108 passes through a seal and pump thrust bearing assembly 109, often termed a 'protector'. The pumped fluid passes over the motor 108 before entering the pump 107 and thus provides a certain amount of cooling of the motor 108.

A power cable 110 for the motor 108 is run up past the pump 107 and alongside the tubing 105 until it emerges at the surface wellhead and passes to a variable speed drive 111. This drive 111 is powered by the utility supply 112 or a generator.

It will be appreciated that other configurations of the installation are possible, such as mounting the pump below the motor, and taking the cable up the tubing or making it an integral part of the tubing. Arrangements, such as that disclosed in U.S. Pat. No. 6,000,915, which accommodate the pump concentrically within the motor bore will generally be found to make poor use of the limited borehole cross section and are not preferred.

Figure 2:
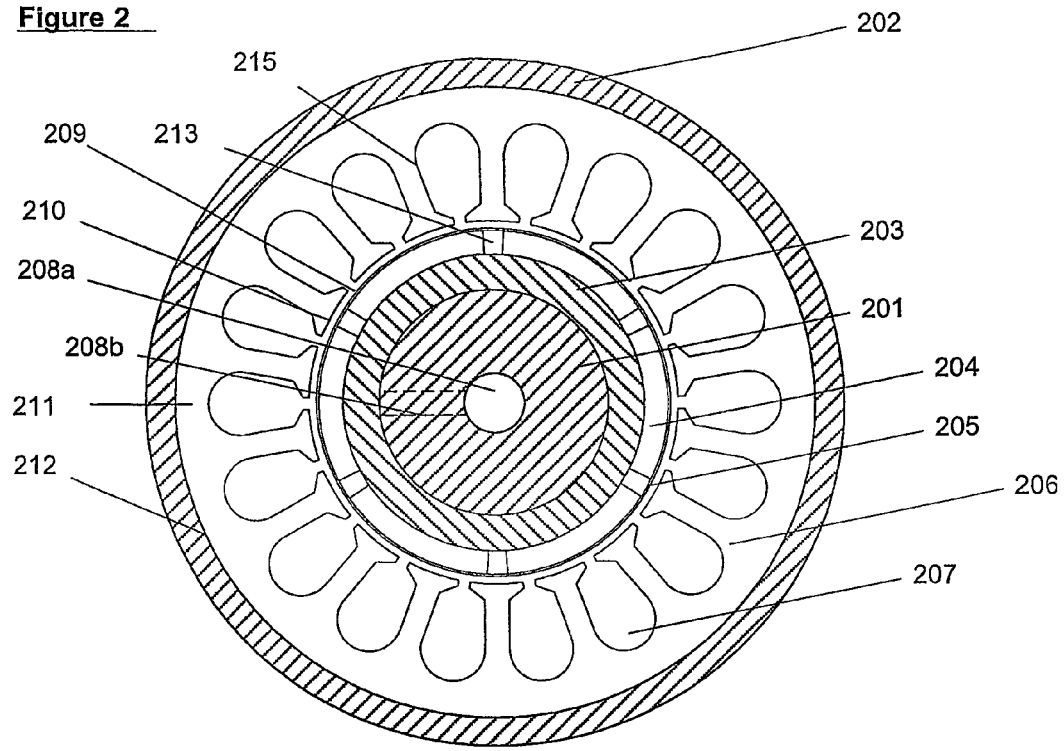
FIG. 2 illustrates an embodiment of a downhole motor in accordance with the invention in cross-section.

FIG. 2 shows a cross-section of an embodiment of PMSM in accordance with the invention comprising a central rotor and surrounding annular stator within a housing 202. The rotor has a central shaft 201 for transmitting the output torques and a plurality of magnetically permeable sleeves 203 carrying permanent magnets 204. The sleeves 203 are torsionally locked to the shaft 201 by keys, shrinkage or other means in the art. It is preferable to make the sleeves 203 separate from the shaft 201 as shown, for reasons of mechanical stability, to facilitate assembly and to permit the optimum strength material for the shaft 201 to be chosen independently of the sleeve material. The magnets 204 are preferably of a samarium cobalt composition as this gives the best economic performance at the temperatures commonly found in deep boreholes used for hydrocarbon production. Other materials such as neodymium iron boron may be used in appropriate circumstances, or improved materials as they become available.

During high-speed rotation the magnets 204 experience considerable centrifugal force, and the adhesive that bonds them to the sleeves 203 may weaken with age. A retaining sleeve 205, preferably of metal, provides a durable means of retention. To avoid the use of materials which degrade during prolonged operation at high temperature, it is preferable to make the sleeve 205 a tight fit by shrinking it on, rather than depending upon tape, adhesives and fillers. The sleeve 205 is preferably of one piece although, for ease of assembly, several shorter rings may be fitted adjacent to each other if required. U.S. Pat. No. 4,742,259 discloses a technique for fitting a sleeve with axial constraint. This technique requires the fitting of end washers that are pressed to the shaft to locate them without using positive abutments to do so. In a preferred arrangement shown I\N FIG. 8a, rings 422, preferably made of non-magnetic, non-conducting material, may be slid onto the rotor sleeve 203, coming up against abutments 424, and the retaining sleeve 205 over the magnets 204 may be rolled over the outer faces of the rings 422, as at 425, thereby locking the whole assembly in place axially without the need for adhesives. Variations on this locking method are possible within the scope of the invention, such as deforming the sleeve 205 with a punch into a detent on the outer surface of the ring 422, or using a snap ring and groove as a shoulder in place of machined feature 424.

Figure 3:
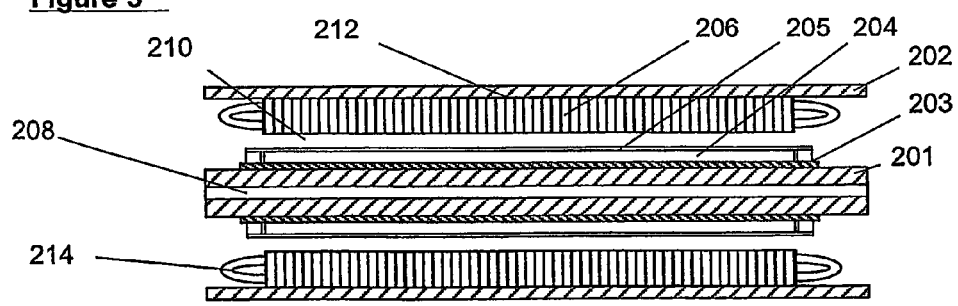
FIG. 3 illustrates the embodiment of FIG. 2 in axial section.

The assembly so far described is termed the rotor, and the length of motor delineated by a sleeve is termed a rotor stage. FIG. 3 shows in axial section a single rotor stage.

The magnets 204 are circumferentially disposed about the sleeve 203, and alternately poled in an essentially radial direction to cause a spatially alternating magnetic flux to cross the clearance gap 209. Other magnet arrangements will be known to persons skilled in the art. The entire motor and hence the gap 209 are filled with a benign fluid, such as a highly refined mineral oil, to balance the inside of the motor against the external wellbore pressure.

Preferably the magnets 204 are plated, for example in a vapour deposition process, with corrosion-resistant material such as aluminium, so that they may resist corrosion from any ingress of moisture into the motor or from other sources, and so that any small loose particles of magnet material will be sealed into the magnets and not come free to circulate within the motor bearing system.

Figure 4:
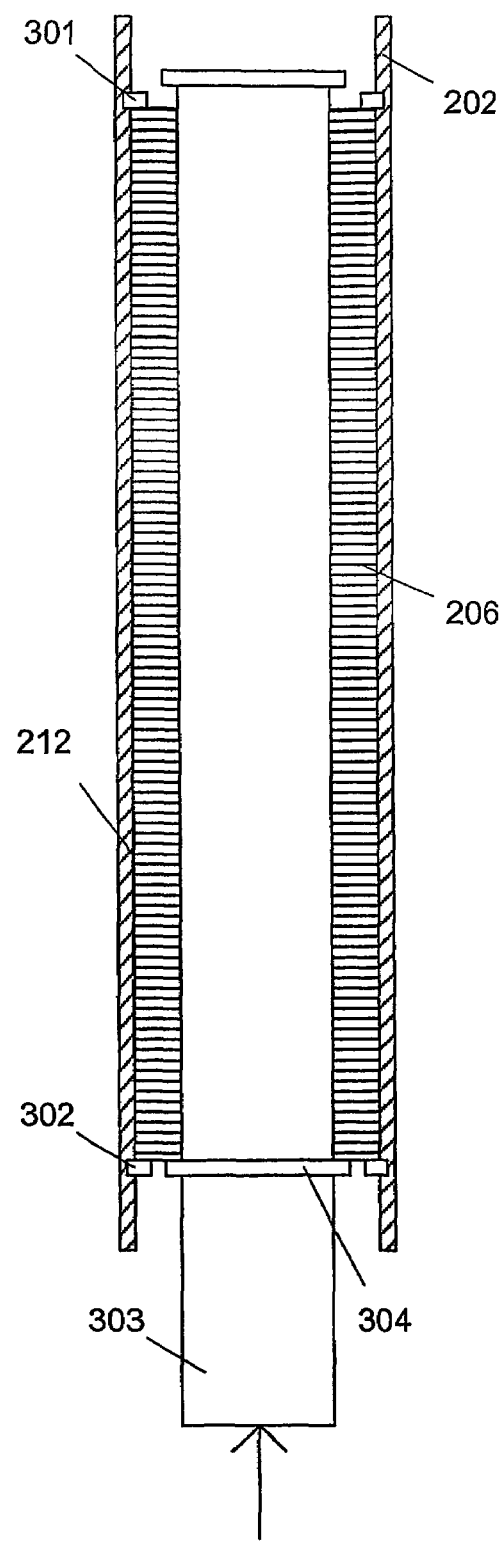
FIG. 4 illustrates the means of assembly of an elongated motor.

Contained within the tubular housing 202 is a stack of thin magnetically permeable laminations 206 as may be seen more clearly in FIGS. 3 and 4. Insulated wire, preferably made of copper coated with high-integrity insulation such as polyetheretherketone or polyimide materials, is wound through the slots 207, and looped back 214 at the ends of the lamination stack as part of the coil winding process. The wound lamination assembly constitutes the stator of the motor.

The PMSM motor constructed as described will have many desirable characteristics for submersible pumping, associated with the general nature of permanent magnet motors. For example, by providing a rotor flux from permanent magnets, there is no need to energise the rotor, unlike the field winding that requires separate power in an induction motor. This reduces the motor current by the amount needed for rotor magnetisation, which therefore reduces the ohmic loss in the stator windings and the power cable. It also eliminates the rotor cage winding and thus an internal source of heating. The copper within the stator is used only for the production of the rotating stator flux. The inherent torque output for the motor, which is derived from a product of space utilisation, rotor flux and stator flux, is very high compared to an induction motor. This torque is available at any speed.

Further aspects of the motor construction may be addressed to give reliable high-speed performance. Firstly, as mentioned above, a major source of inefficiency in induction motors is the frictional drag in the necessarily small rotor-stator gap. In a normal mass-produced PMSM the gap is also kept small in order to economise on the amount of magnet material required. However, if it is considered that permanently magnetic material is not itself significantly magnetically permeable, then for magnetic purposes the gap between the stator and the rotor is that between the lamination tip 210 and the outer surface of the sleeve 203. The mechanical clearance gap 209 is only a part of this. Thus, if, for example, the magnet thickness was 3 mm and the clearance gap was increased from 0.25 mm to 1.25 mm, or 500%, the magnetic gap would only have increased 30%. With only a modest increase in the amount of magnetic material it is possible to purposely design the motor to ensure a sufficiently large mechanical clearance such that at high speed the fluid in the clearance is turbulent. Above 5400 rpm for a rotor of diameter more than 50 mm a gap greater than 1.25 mm is preferred for this purpose. A designer may use the known Reynolds number theory to estimate the needed gap size for other operating conditions, fluids and motor sizes. Although the friction loss is higher in turbulent flow than in laminar flow, turbulent flow ensures much more effective heat transfer between the rotor and the stator, so reducing the maximum internal temperature. At any speed the large clearance will reduce the likelihood of mechanical damage to the rotor during installation caused by bending of the outer housing, and also provide a measure of tolerance to contaminant particles.

Furthermore, it will be found that the deliberately large gap reduces the eddy current losses, and hence heating, induced in the retaining sleeve 205 and magnetic material according to their conductivity. These losses increase approximately as the square of rotation speed, but diminish with distance from the lamination tips 210. The inter-magnet spaces 213 may be filled but, unless care is taken to seal the cavity, particles of filler may dislodge over time and damage the motor. If required the cavities may be left unfilled. This is made possible by the sleeve 205, since it presents a low drag rotating surface to the clearance gap while making an enclosure to trap the fluid in the cavities. This trapped fluid is limited to bodily rotation or axial flow and does not contribute to friction in the clearance gap.

A further reduction in eddy current losses in the rotor can be obtained by laminating the magnets axially. Rotor eddy current losses originate from flux harmonics in the stator, the eddy currents circulating on the face of the magnets and penetrating through the depth of the magnets and then into the steel that the magnets are bonded to. Most of the ohmic losses resulting from this current flow are in the magnets, assuming the retaining sleeve is non-conducting or very thin, and the current flow increases with the face area of the magnets. Accordingly, in the same way that the stator steel is laminated to reduce the effect of rotor flux, the magnets can be laminated to reduce the effect of stator flux. For an elongated motor the face area is the width of the magnet times the continuous length of the magnet section. Therefore, by using a series of short magnets to make a continuous length that are electrically isolated from one another where they would otherwise touch, the effect is to produce an axially laminated magnet. Practically the magnet ends may be coated with epoxy or varnish during assembly or spacers used. An approximately equal length and width of each magnet will be found to give a good reduction in losses while not unduly complicating manufacture. This method is unlikely to work usefully in motors of conventional length to diameter ratios as the magnet face area is already relatively small.

Other types of PMSM construction are possible, while maintaining the large gap. A slot-less construction in which the laminations become a stack of rings, or are replaced with a magnetically permeable tube, requires much more magnet material and will normally be found uneconomic for submersible pumping.

It is also possible to design the PMSM so that the slots are fully closed or almost fully closed in the vicinity of the lamination tips 210. This ensures the retention of the winding without use of insulating retaining wedges that may degrade. It also reduces the cogging torque, that is the alternating accelerating and retarding torque developed as the magnets come into and out of maximum overlap with the teeth.

For the purpose of maximum power output at high efficiency it is necessary to optimise the electromagnetic design. Unlike conventional submersible pump induction motors, which invariably have two poles for the reasons given above, it will be found that the optimum number of poles is usually six or more for PMSM motors up to approximately seven inches (17.5 cm) in diameter. Four poles will give an acceptable output for smaller motors but even more poles are preferred for larger motors. The higher pole count allows the flux density in the stator laminations to be better distributed so that the amount of steel in the outer areas 211, may be reduced. This permits the area of the slots 207, and hence the amount of copper in the windings, to be increased. When the high frequency restrictions discussed below on drive output are considered it will be appreciated that, in larger motor sizes, higher pole counts are more demanding of the drive. A limit may be reached where accepting additional stator lamination outer material is appropriate to make the drive practical. Conversely as taught in U.S. Pat. No. 6,388,353, with drives and step-up transformers typical of oilfield induction motor technology, a high pole count motor permits operation at low speed and high torque for progressive cavity pumps. For example, a ten-pole motor driven at a frequency of 60 Hz will rotate at 720 rpm.

Figure 5:
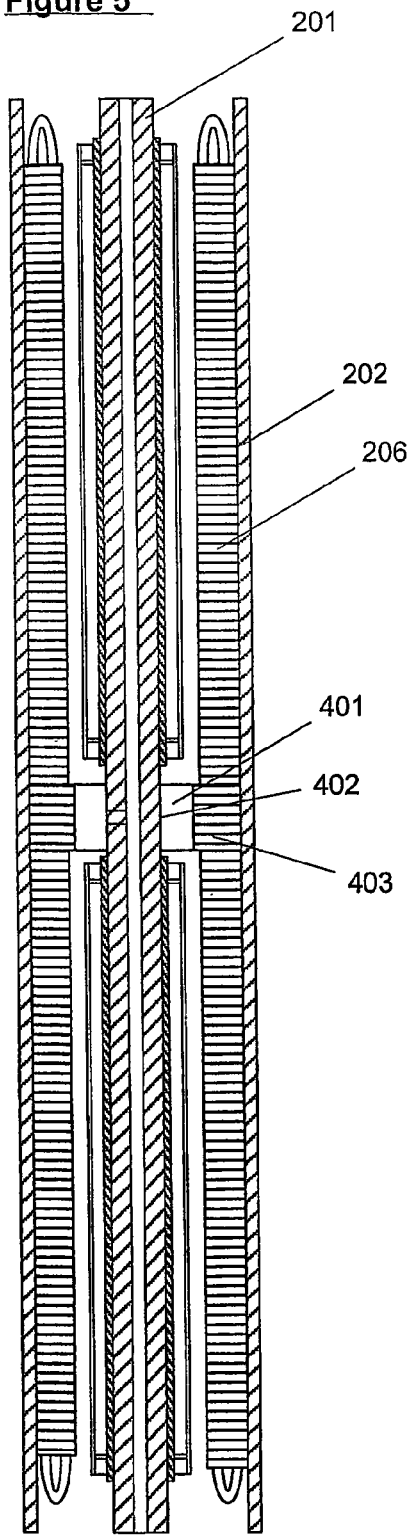
FIG. 5 illustrates a possible construction of a motor stator in a housing.

FIG. 5 shows a representative cross-section of a PMSM motor of the present invention constructed using known technology in the field of submersible induction motors. A plurality of rotor assemblies is used to achieve the desired output power, the assemblies being rotationally locked to a common shaft 201 running continuously through the electrical section of the motor. Shaft stability is ensured by bearings 401 between each rotor assembly. These bearings 401 are commonly made of two concentric rings running freely one over the other, one keyed axially and rotationally to the shaft 201 and the other locked to the stator bore using thermal expansion caused by the motor's self-heating, or pegged in some way. An advantageous feature of the motor design is that bearings are provided at each end of the stator to improve rotor stability. Existing motors having end bearings located towards the ends of the motor and beyond the stator end turns present a potential instability vibration issue due to the unnecessarily long unsupported rotor section.

U.S. Pat. No. 4,513,215 and U.S. Pat. No. 4,521,708 teach means added to the bearing outer ring for pegging or gripping the bearing outer ring to prevent rotation during motor start up, before thermal expansion has taken effect. However the larger shaft diameter made possible with PMSM motors necessarily reduces the bearing outer ring wall thickness so that such known methods cannot be used with such motors. FIG. 37 shows a bearing outer ring 3704 suitable for use with PMSM motors utilizing a spring clip 3702 fitted to the stator which engages in a shallow axial groove 3701 in the bearing outer ring 3704 (as may be best appreciated by referring to the inset view showing a section taken normal to the plane of the drawing). The spring clip 3702 is preferably an open circular spring, such as a commercial circlip or steel wire, since this provides a natural axial resilient lead-in as the spring clip 3702 engages the bearing outer ring 3704. When the bearing outer ring 3704 is inserted into the stator bore, in all probability the groove 3701 will not be opposite the spring clip 3702. The resilient lead-in allows the spring clip 3702 to push back to allow bearing insertion. When the motor starts, the bearing outer ring 3704 will rotate until the groove 3701 comes opposite the spring clip 3702, allowing it to expand and engage the groove 3701, thereby preventing further rotation. A spring loaded pin or cantilever may also be used. In normal construction the stator is made of brass or possibly steel laminations 403 at the bearing sections. To make the stator-mounted spring clip 3702 practical, these laminations are preferably replaced by a single thick block 3703, cut as if it were a very thick lamination (slots not shown in FIG. 37). This may be a casting. The spring clip 3702 is then mounted in a pocket in the block so that it cannot fall out during assembly. A small peg 3705 prevents the spring clip 3702 rotating.

Figure 7:
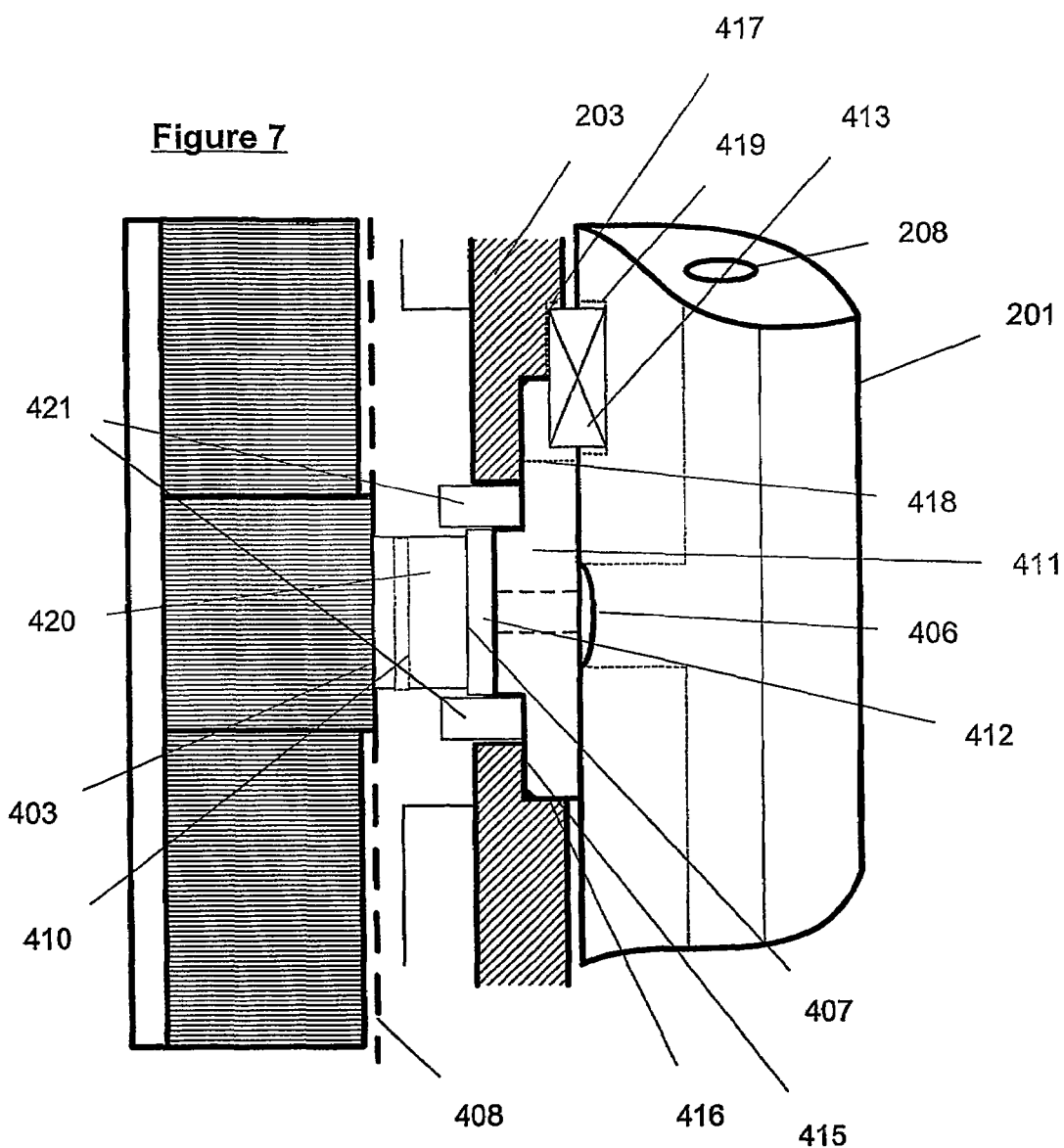
FIG. 7 illustrates a possible rotor journal bearing.
Figure 8:
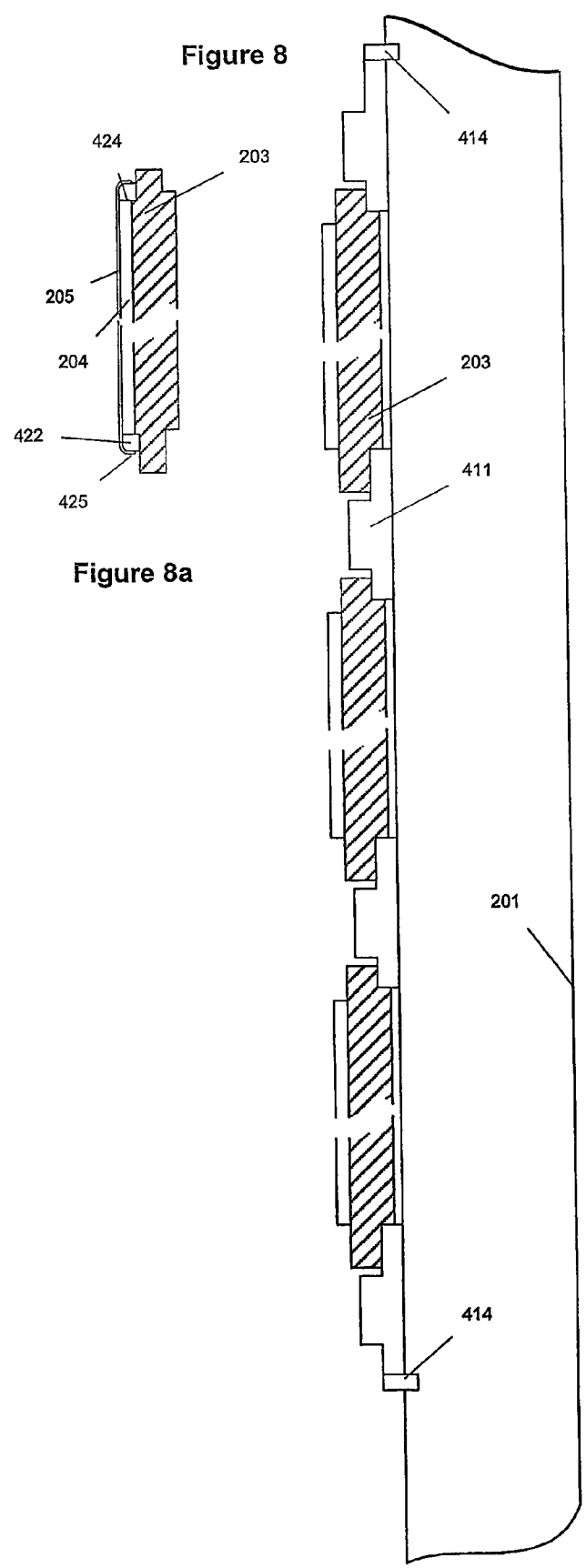
FIG. 8 illustrates a possible rotor assembly.

An improved method of assembling the rotor illustrated in FIGS. 7 and 8 simplifies the bearing assembly and also the means of affixing the rotor sleeves 203 to the motor shaft 201, using a reduced number of parts.

The need to assemble the rotor with long solid sleeves 203 presents a problem in that a stable fit to the shaft 201 is necessary, but the required shaft straightness for closely fitting sleeves 203 to pass smoothly over the shaft 201 during assembly is very demanding. The preferred means of assembly is to use support rings 411 as shown in FIG. 7. These rings 411 are a close fit on the shaft 201 but, being short in length, will slide easily over it. Lands 415 provide a concentric fit for the sleeves 203 and shoulders 416 provide an axial abutment. The bore of the sleeve 203 is only a loose fit on the shaft 201. As shown in FIG. 8, one or more sleeves 203 and support rings 411 may be threaded onto the shaft 201, and axially constrained by convenient means such as snap rings 414. Each sleeve 203 must be rotationally fixed to the shaft 201 in order to transfer the motor torque, and each ring 411 must be prevented from rotation on the shaft 201 in order to eliminate wear. Referring again to FIG. 7, a key 413 may be provided to accomplish this, in which case, during assembly, the ring 411 is first slid onto the shaft 201, then the key 413 is inserted into a groove 419 in the shaft 201 and within a locating notch 418 in the ring 411. The sleeve 203 has an internal groove 417 so that, when it is slid onto the shaft 201, it becomes rotationally locked to the shaft 201 by the key 413 and also prevents the key 413 from subsequently falling out.

The use of a relatively short key, such as the key 413, ensures that the torsional stress in the sleeve 203 is limited to that caused by the torque generated by the magnets on the same sleeve 203. In a long motor, the portion of the shaft 201 under the sleeve 203 nearest the output end of the motor will carry a high torque accumulated from all the other sleeves. Particularly where multiple motors are connected in series to increase power output, this torque can be very high. If the accumulated stress in the shaft 201 were to be shared with the sleeve 203 by way of a long key, there would be a risk that the magnets, being brittle, would fracture. (In submersible induction motors long keys are used to maintain all the laminations of the rotor in alignment, as well as to transfer torque.)

A further consequence of very high torque is that twist in the shaft 201 may cause sleeves 203 at opposite ends of the shaft 201 to come out of alignment with each other and hence with the stator, with the result that the sleeves 203 cannot at the same time produce maximum torque. U.S. Pat. No. 6,388, 353 suggests mounting the sleeves on the shaft with an angular skew relative to one another so that, when twisted in use, the sleeves are brought back into alignment. Alternative methods that can be used with series-connected motors are (i) to stagger the angle of each shaft to the next in line, such as by cutting the splines at the ends of the shaft with a small angular offset relative to one another, or (ii) to connect the housings to one another with a small angular offset. Within a single stator, the simple expedient of twisting the stator will effect a compensating correction to a twisted shaft, and is similar to a well-known technique for reducing motor cogging torque. The compensation of all these methods has variable effectiveness as the skew is fixed at one angle to compensate the angle of twist at one level of torque, and cannot therefore be correct at other levels of torque. It should be noted that the amounts of twist referred to are very small, typically less than a degree, and the problem may not be significant if the motor is designed to maximise shaft diameter and hence resistance to torsion. Accordingly it is preferred to design elongated motors so as not to suffer from excessive shaft twist.

The sleeve 403 carries, or is integral with, the shaft bearing. A ring 407 of bearing quality material, such as that marketed under the tradename Deva Metal, may be pressed onto the ring 411. The outer ring 420 of the bearing runs on the ring 407, and is axially captured by thrust washers 421 which themselves are captured between the sleeves 203 and the support rings 411. Alternative arrangements for the bearings, in which for example the support ring 411 is made entirely of bearing material, eliminating the ring 412, are possible within the scope of the invention. Similarly the outermost rings 411 may be of modified shape as their outermost ends do not mate to rotor sleeves.

Substantial heat, of the order of 100 W, will be generated within the bearing. This heat is transferred to the laminations and thence the motor housing by two main means, namely conduction through the outer ring 420, and conduction through the support ring 411 and the rotor. In the latter case heat passes through the magnets near each bearing and across the oil-filled rotor/stator gap. This second path, though less direct than the first, will significantly raise the magnet temperature. A thermal insulator in this path between the bearing running surface and the magnet, such as may be provided by making the support ring 411 of ceramic, will increase the thermal resistance in this path, and thus reduce the magnet temperature rise.

Figure 9:
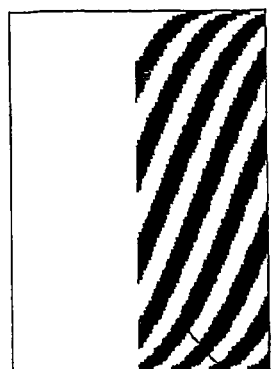
FIG. 9 illustrates a bearing that creates internal support pressure.

In a completed PMSM the rotor is centred by the bearings 401 and so is magnetically balanced. Particularly when the motor is installed vertically the bearing loads will be very low, and the bearings 401, which necessarily run hydrodynamically for maximising lifespan, may become unstable, resulting in shaft whirl and other vibrations. In the present invention therefore, the bearings 401 must be designed to create sufficient internal pressure to remain stable and hydrodynamic at low shaft load. FIG. 9 shows a means of achieving this in which a proportion of the length of each bearing 401 is etched or machined with spiral grooving 409. The grooving 409 swirls the oil within the bearing 401 at interface 407, increasing bearing pressure and enforcing stability. The length of grooving 409 is a means of varying the pressure. The grooving 409, being inherently a miniature pump, controls and also promotes flow of oil through the bearing 401, assisting in cooling and cleaning it. Alternative bearings, such as known bearings with non-circular bores, may also be used to achieve stability.

A further means of purging oil through the bearings 401 is to bore the motor shaft 201 for the introduction of oil throughout the length of the motor to cross bores 406 at each bearing 401 as shown in FIG. 7. Utilising an impeller or cross drillings on the shaft 201, preferably by way of an oil filter thereupon, oil is forced into the shaft 201, through the bearings 401 and then returned by way of the rotor-stator clearance 409. Pilot bores 410, as shown in FIG. 7, or grooves in the bearing housings or the stator bore may be provided to assist this return path, as will unfilled interstices between the magnets on the rotor. The bearing running clearances, being small, resist and thereby limit the flow of oil from the shaft 201. This is particularly the case for plain bearings. Because spiral groove bearings control their rate of oil intake, it is preferable to arrange a copious supply of fresh oil near the inlet end of the bearing 401, such as by making the cross bores 406 near and at least partially beyond the inlet end of the spirals. Then there is no need to force the oil through the bearings 401. Instead the oil moves freely through the bores 406, circulating past the bearing, while the bearing ingests the portion of the oil that it requires. Alternatively or additionally, oil that is flowing axially through the rotor-stator annulus would not normally help to lubricate the bearings 401 as no pressure is developed to force it into them. The spiral groove bearings will benefit as they ingest from the flow. This method thereby separates the general circulation of substantial rates of fresh and cooling oil from the individual bearing lubrication process. It is generally applicable to any type of elongated fluid-filled motor.

If the stator bore is of constant, carefully controlled diameter, then the rotor assembly, complete with bearings, may be slid into the stator. The stator thereby provides the outer support for the bearing outer rings 420. However this known arrangement necessarily requires the bearing rings to rub the stator bore during insertion, with the possible risk of abrasive damage.

Alternatively the stator bore may be made of smaller diameter 403 in the axial sections opposite the bearings, such that the reduced bore lies within the stator to rotor clearance, as indicated by the broken lines 408 in FIG. 7. In the assembled position shown in FIG. 5, the bearings 401 are shown in contact with these specially reduced sections 403 of bore.

This means of assembly is not immediately suited to PMSMs due to the extremely high side magnet forces between the rotor and the stator caused when the rotor becomes slightly centred in the stator bore. This is well known in small industrial motors where external fixtures are used to handle the forces involved during insertion. In an elongated motor the problem is very serious since it is not effective to support the shaft from each end. It may be found from electromagnetic calculations that a force of thousands of Newtons per meter of rotor length and millimeter of deflection may be produced. A much smaller force is sufficient to bend, or deflect, a shaft held only at its ends. Any deflection increases the side force leading to more deflection. Thus if the rotor bearings mate only to a restricted stator bore, then for most of the insertion process they will not provide support to the rotor, and the rotor will deflect until the bearings touch the stator bore between the restricted sections. It would be difficult to slide the rotor into the motor, and also the bearing outer diameters will now be offset from the restricted bore section 403, so that the restrictions become obstructions.

Figure 27:
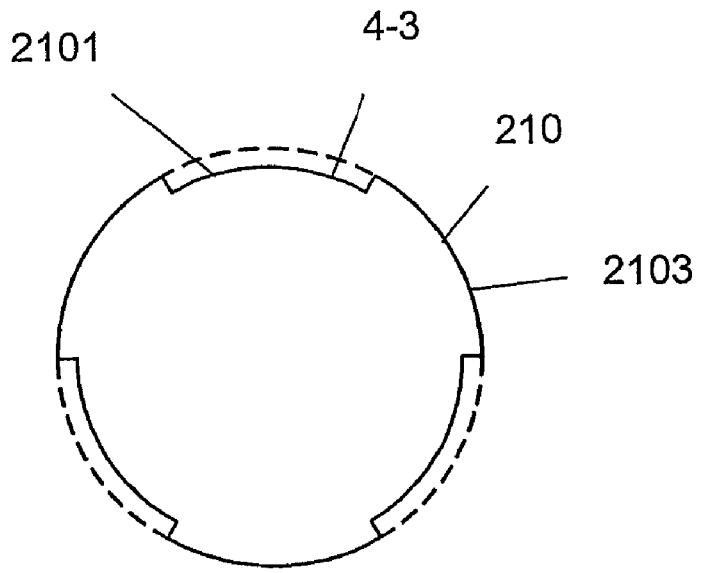
FIG. 27 shows a stator bore cross-section.
Figure 28:
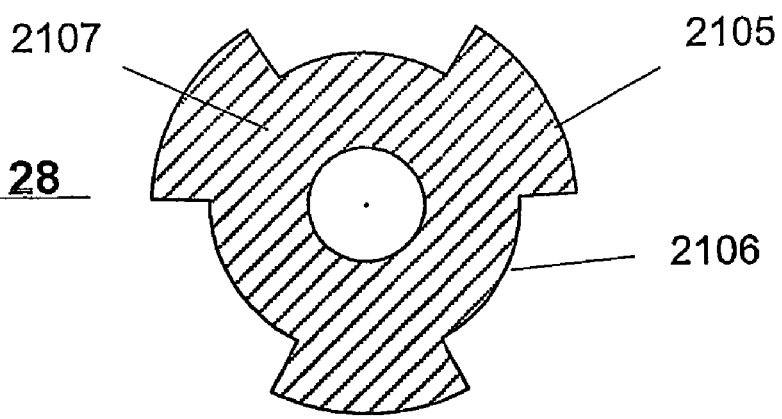
FIG. 28 shows a mandrel cross-section suited to the manufacture of a stator assembly of an elongated permanent magnet motor of the present invention.
Figure 29:
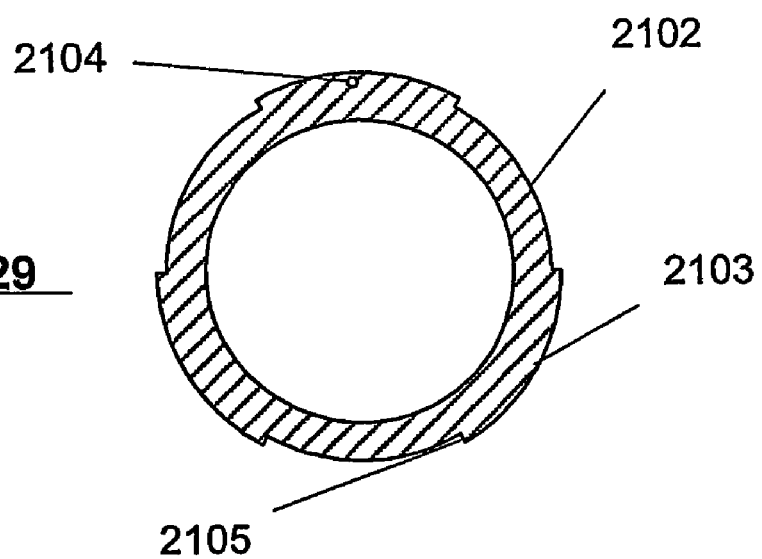
FIG. 29 shows a bearing outer housing suitable for insertion in an elongated permanent magnet motor of the present invention.

FIGS. 24 to 29 show representative means of the invention for overcoming these problems. More particularly FIG. 27 is a cross-section of the stator bore in the vicinity of the bearing restricted bore section 403. The restriction surface 2101 is interrupted by three equiangularly spaced cutaways 2103 that take the bore back to the normal diameter of the lamination tips 210. FIG. 29 is a cross-section of the bearing outer ring incorporating three equiangularly spaced rebates 2105 and intermediate lands 2104 corresponding in position to the cutaways 2103 of the restricted bore section 403, the rebated surface 2102 having the same diameter as the restriction surface 2101, and these surfaces 2101, 2102 mating when the rotor is finally installed and the bearings are in the restricted bore section 403, as shown in FIG. 24. The outer surfaces 2113 of the bearing outer ring are a sliding fit with the lamination tips 210. At interim positions during installation, as shown in FIG. 25, the outer surfaces 2113 provide a good degree of centralisation of the shaft 201 between each rotor assembly. This mechanical support ensures the rotor side forces remain acceptably low during rotor insertion, and make it possible to insert the rotor assembly without damage. The external fixture will necessarily constrain the axial movement of the rotor to prevent it being pulled into the stator by the magnetic force. It will be apparent to a skilled person that, by suitable shaping of the leading edges of the rebates 2105, the alignment of the rotor bearings to pass through the bore restrictions may be facilitated. However, in a motor with many bearings, this will remain troublesome. The larger rotor-stator gap in a PMSM permits a means of alignment to be used in which each bearing ring is bored so that a stout wire, such as a tempered steel wire, may be threaded through each bearing. Keeping this, or a guide strip in a groove cut in the surface 2103, taut will greatly facilitate the alignment of all the rebated bearings as the rotor is inserted.

FIG. 4 shows a first step in the known, labour intensive method of manufacturing an electric submersible induction motor stator. The loose laminations 206 are threaded onto a mandrel 303 and inserted into the housing, being prevented from escape by an internal ring 301. The shoulder 304 is then used to compress the lamination stack, which is fastened in place by a second internal ring 302. The housing length extends beyond the laminations considerably further than the illustration shows, in order to leave space for the stator winding end turns and for mechanical components. Winding the stator is laborious as the conductors have to be threaded axially through the slots back and forth, turned around, wrapped in additional end insulation and inspected, all taking place inside the housing ends. Furthermore, the laminations necessarily are a relatively loose fit in the housing in order to be able to slide them in. This leaves a significant thermal contact resistance between the laminations and the housing, which impedes heat transfer, raising the motor internal temperature and hence reducing its reliability. During motor start up, the torque reaction on the stator is transmitted to the housing by way of rings 301 and 302, and, when the motor has warmed up, the stator expands so that it grips the housing along its length. It is a significant mode of failure during start up for the middle section of the stator to twist between the ends portions, thereby damaging the windings, and the arrangements described below are effective in preventing such failure.

The preferred embodiments of the present invention radically change the method of assembly of elongated motors. Firstly the more conventional approach to making small non-submersible motors is adopted, in which the stator is wound before insertion into its housing.

A shrink fit of the finished stator is used to ensure high contact pressure with the housing, reducing thermal contact resistance and thereby minimising the internal temperature of the motor. However the invention provides for the special circumstances of an elongated motor that has internal bearing surfaces that may be on a reduced stator bore diameter. FIGS. 26 and 28 illustrate a means of aligning the laminations ready for winding utilising a rebated mandrel 2107 having outer surfaces 2105 that are a close but sliding fit in the stator bore. The rebates 2106 are clear of the restriction surfaces 2101. This mandrel 2107 provides a centring surface for all the laminations, including those used for the bearings. A simple nut and shoulder on the mandrel 2107 is sufficient to clamp the laminations ready for winding by threading of the wire through the slots. The shoulders of the rebates 2106 may be partly tapered to bring the bearing laminations into rotational alignment. However, in order to reduce sliding friction when the mandrel 2107 is eventually removed, the surfaces 2105 are preferably reduced to thin ribs or have ridges that reduce the contact area. If the laminations are open to the stator bore, or if the tips have notches on the internal bore, such features on the mandrel 2107 or inserts mounted thereupon may be used to rotationally align all the laminations.

The laminations may be welded together on their outer diameter so as to maintain the close stacking of the laminations, or some other known means may be used. After winding and possibly varnish impregnating, the stator may be ground on the outside diameter to make it a close fit in the housing. Preferably the housing will be pre-expanded in order that, after insertion of the stator, the housing will relax to a shrink fit. The pressure of contact will then greatly reduce the contact thermal resistance. A means of expanding the housing for assembly is to pre-heat it. Conversely, to repair a stator, or to recover the housing for re-use, it will be necessary to expand the housing with the stator in situ. The length of the stator renders the required force to be too high for a press tool to be used. A preferred means is to use an induction heater, which essentially comprises an electrical coil that slides over the housing, the coil being connected to a power generator of appropriate frequency. It is known from the theory of induction heating that, by choosing a frequency such that the skin depth of radiation in the housing does not penetrate through the housing, energy may be rapidly and selectively imparted to it without penetrating the stator. This provides a time window in which the housing will release the stator and the stator may be extracted before it becomes heated by diffusion and expands to re-establish the lock. This method is suited even to elongated motors.

A further method with great advantages in terms of manufacturing and repair cost, as well as in terms of reliably preventing the stator from rotating within its housing, is to mechanically lock the stator to the housing with an anti-rotation device or devices. One possibility is to provide an axial key 3603 between the stator and the housing 202, as illustrated in FIG. 36. The housing 202 is formed with an axial groove 3601, such as by milling or broaching, and the stator is formed with a corresponding axial groove 3602. The axial key 3603 or series of keys fits in both grooves 3601, 3602 so as to prevent the stator from turning relative to the housing 202. This technique avoids the need to either press fit the stator with great force or to shrink fit the housing over it, both of which are inevitably time consuming in manufacturing terms and require specialist equipment. With the keyed housing there is no possibility for breaking free. It will be apparent that there are many other possible arrangements that can be adopted using keying, such as leaving an integral raised feature on the circumference of the lamination which locates in the groove 3601. Where the laminations are pre-bonded into shorter lengths the anti-rotation device may be applied on a per length basis.

The embodiment disclosed has the further advantage over conventional construction of induction submersible motors that, by providing easy access to the end-windings, the highest quality winding procedure may be followed and the results easily inspected. This technique is applicable to all types of elongated motor.

Figure 30:
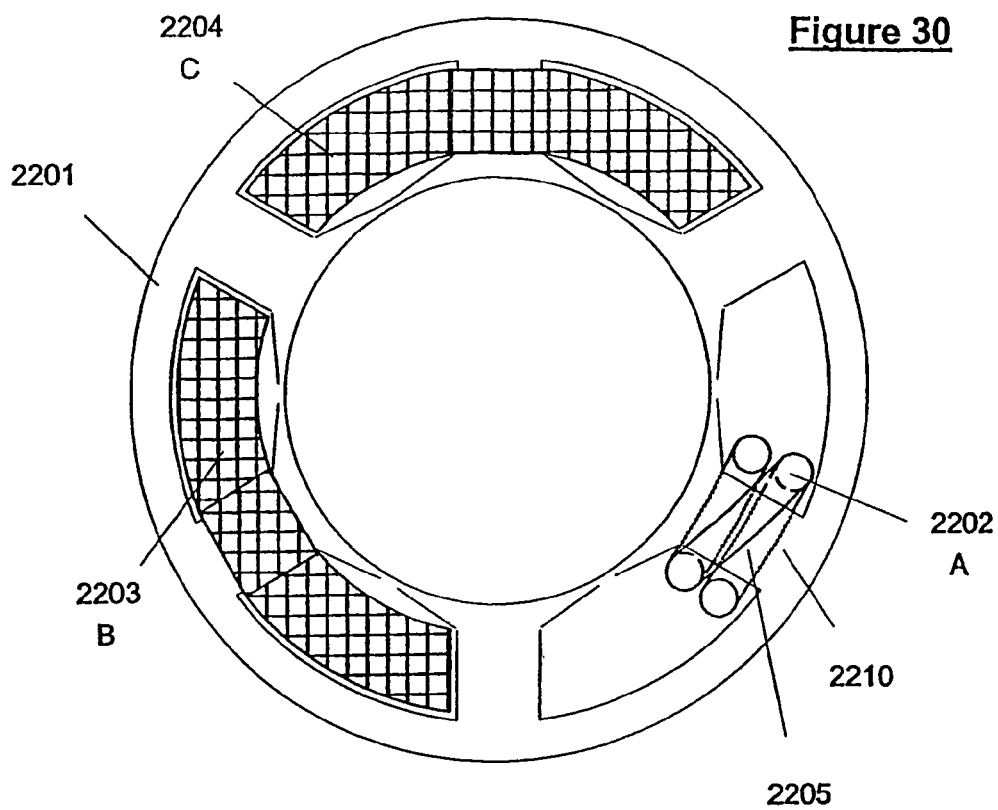
FIGS. 30 and 31 show schematic end views of the stator assembly of a motor in accordance with the invention, FIG. 31A showing a detail within a slot of the assembly.

FIG. 30 shows an improved reliability and improved performance method of winding a PMSM. The winding is a known short-pitched concentric winding, which is not normally suited to industrial PMSMs or induction motors because the back-emf waveform is far from sinusoidal. It may however be driven by a variable speed drive in which the back-emf waveform is taken into account, and it is particularly suited to the variable speed drive embodiments of the present invention that are disclosed below. In the example shown the motor has three phases A, B, C. The laminations 2201 have six slots for an eight-pole rotor. For phase A, coil 2202 is wound through adjacent slots so there is a single tooth 2210 separation between the coil sides. Identical coils 2203 and 2204 are wound on alternate teeth for the other phases B and C, where the hatching emphasises the extent of the completed coils. The slots are shown closed at the stator bore as this is preferable.

One advantage for reliability is that there are only three coils, one per phase. Consequently there is no crossing of phase windings at the end turns. The end turns 2205 possess further advantages. The end turns 2205 fall naturally within the radial limits of the slots and are short. This minimises risks with insulation chafing, provides a short path back to the stator for conduction cooling, and has minimal energy waste in unproductive copper. This in direct contrast to double-layer lap windings, as used in induction submersible motors. In these the end turns need to expand beyond the radial limit of the slots and/or become very long in order to accommodate the wire crossings between layers and phases. Since the winding area is constrained by the housing internal diameter and the bearing/rotor outer diameter, the problem is severe.

Figure 31:
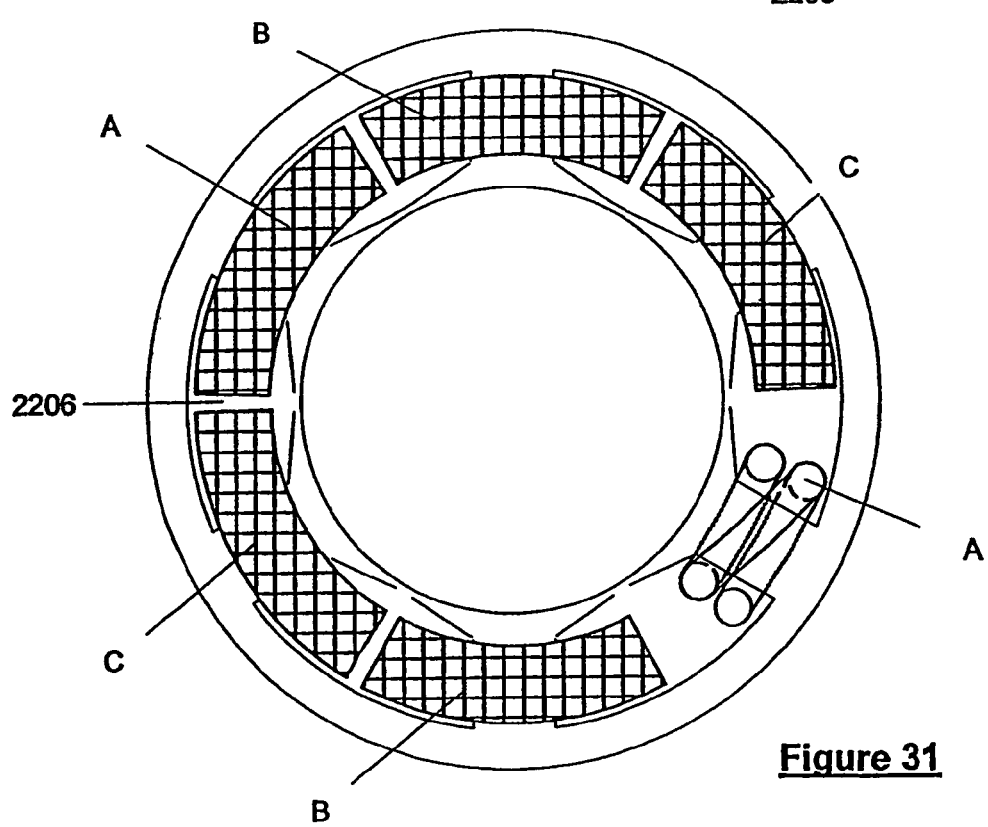

A winding with six slots and eight poles as described above provides phase separation in the slots. However, at high speed, the high pole count makes heavy demands of the variable speed drive as described below. Furthermore the self-inductance of each winding is high, requiring more drive voltage to overcome its reactance for a given motor current, which is manifest as a poor power factor. A compromise embodiment of six poles and nine slots for a motor having three phases A, B and C, as shown in FIG. 31, is satisfactory and preferred. In this embodiment three series-connected coils are provided for each phase, and each slot accommodates the coils of two phases. However, since these coils are wound around separate teeth, they are naturally spaced apart by a gap 3106 as indicated in FIG. 31 and can be well insulated from each other.

A preferred improvement to the laminations where two coils are adjacent in the same slot is to introduce partial teeth 3110 shown representatively in FIG. 31A. These teeth have little effect on the motor magnetic circuit as they do not form a closed loop around the coils. However they form an intermediate path for heat transfer to the outside of the motor, and, if the motor body is held near the potential of the neutral point, there is less strain on the insulation between each of the coils and the tooth 3110 than between the coils of different phases.

A further, preferred feature, that may be used where the coils are pre-fabricated and accommodated in a common slot including partial teeth 3110 for separating adjacent coils as shown in FIG. 31A, is the provision of slots that are substantially shaped to conform to the cross-section of the coils in order to provide close thermal contact and mechanical support between the coils and the surrounding laminations. Such an arrangement is shown in FIG. 38 in which only one of the coils is shown within the slot, and the coil comprises four coil sections 3801 preformed from rectangular wire, each individual coil section being encapsulated within a respective layer of insulation 3803 and the coil sections being fitted together to form a rectangular bar which is itself encapsulated within an overall layer of insulation 3802.

A further, and preferred, aspect of the present invention is shown in FIG. 32, which, for convenience in drawing, is again shown based on six-slot laminations. In this case the laminations are made in two parts, as if split in the vicinity of the root of the slots so that a multi-tooth inner part 2207 and a circular outer part 2208 are obtained, as shown separately on the right hand side of the figure and fitted together on the left hand side of the figure. These parts 2207, 2208 are preferably made from the same piece of material and are thus of closely similar thickness. In the final assembly this will reduce bridging of the tooth tips between laminations due to thickness mismatches. In the assembly process the lamination parts 2207 are assembled onto a mandrel, and separately wound and formed coils, preferably vacuum pressure impregnated and over-wound with protective insulation, are then simply slid over the lamination teeth 2209 of the parts 2207. Sometimes varnish is considered unsuitable in the face of hydrolysis from moisture ingress into the motor. In these cases, wire insulation such as polyetheretherketone may be used in loose coils, whilst still being wrapped to resist chafing in the electromagnetic fields of the motor. Conveniently stacks of outer laminations 2208 bonded together or welded along their exterior are slid over the wound core to complete the stator. While it is possible to heat-shrink these onto the wound core, the housing shrink fit disclosed above will also apply the light compression necessary to ensure good mechanical stability of the stator.

The outer lamination stacks may instead be made as magnetically permeable tubes of cast insulated iron powder, with the advantages of offering a smooth surface where the inner and outer parts of the stator come together, and of economy of materials. Each tube may be made by combining smaller arcuate segments, to reduce the size and cost of the casting, such an arcuate construction being unfeasible with laminations which would effectively be small steel fragments. The partial teeth disclosed above may be incorporated into the outer ring of the split lamination. The disclosed multi-part stator must also be multipart or open-slotted outwards at the bearing sections 202 to permit loading of the winding from the outside.

This method of assembly translates the known advantages of form-wound coils used in physically large industrial motors to the difficult elongated small diameter geometry of submersible motors.

Form-wound coils for lap wound large motors are manufactured separately from the laminations and are then inserted into rectangular slots open to the stator bore. In submersible motors there is insufficient working space in the bore of the laminations to load the formed-coils ready to insert into the slots, and for high speed motors the open slots would cause substantial losses.

By opening the lamination slots from the outside, the invention permits formed coils to be used while not incurring these problems. The particular advantage of the concentrated winding is that the formed coils are very simple and that the large winding slots for the small size of motor facilitates the use of semi-rigid rectangular or wedge-shaped copper wire.

With formed coils the wire is bent once at any position as it is wrapped to form the coil, unlike the conventional process for winding elongated motors in which the wire is threaded back and forth through the slots. Consequently a much more rigid wire may be used, as there is no work hardening and insulation damage that would occur if it was attempted to wind conventionally, with repeated bending. Rigidity solves the known problem in elongated motors of wires crossing within a coil deep inside the stator. It provides a non-rubbing and stiff end turn assembly. Round wire is known to give a very poor copper fill factor in a slot compared to rectangular wire, essentially because the latter packs together better. Typically the thermal conductivity from the copper through its insulation back to the lamination is improved also. With a high copper fill the motor will have much reduced internal heating compared to a conventionally round wire wound motor. This is a source of improved reliability, or alternatively of higher torque for the same temperature rise.

While rectangular wire is preferred, it will be appreciated that formed coils made from round wire will nevertheless be superior to round wire conventionally wound by threading through a stator. For a lower pole count motor, such as the commonly used two-pole induction motor, the winding pitch is necessarily substantially half the circumference of the motor. This means that many end turn crossings are unavoidable. The flexibility of round wires is beneficial in this case, whilst retaining the key advantage disclosed above of prefabricating the coils.

Formed coils that are fully encased in insulation over the portions that enter the stator slots do not require insulating slot liners. Furthermore it is not necessary to impregnate the coils after insertion to complete the insulation and secure them into the slots, provided that the insulation is impregnated or encapsulated prior to insertion and the slots are shaped to retain the coils as disclosed above. The means that the present invention not only allows the stator to be removed from the motor housing, but permits the winding to be disassembled from the stator. Axial movement of the coils can be prevented by inserting insulating blocks between the end turn loops and the stator.

Despite the many advantages of the split lamination construction, it does require careful design and attention to manufacturing to ensure satisfactory engagement of the stator parts. All the aforementioned advantages for windings may be obtained when the number of coil turns is not too large, and especially for short-pitched coils, by using one-part laminations as will now be described with reference to FIGS. 39a and 39b. A four-turn coil is made first from four U-shaped coil sections 3901 bound together by a layer of insulating material 3902 over at least the straight parts of the coil sections 3901 as shown in FIG. 39a, each such coil section being termed a hairpin coil. During manufacture the open ends of the U-shaped coil sections 3901 are inserted directly into the laminations and bearing sections from one end without requiring them to be divided into two or more parts. Once this has been done the coil loops may be completed by joining appropriate ends together 3903 as shown in FIG. 39b, for example by brazing directly or using bridging pieces. These joints may then be covered with insulation, such as insulating tape, and impregnated or encapsulated. It will be appreciated that the details of the hairpin structure may be varied in a number of different ways within the scope of the invention. It is not necessary in any of the coils for the start and finish of a coil to be at the same end of the structure.

Figure 6:
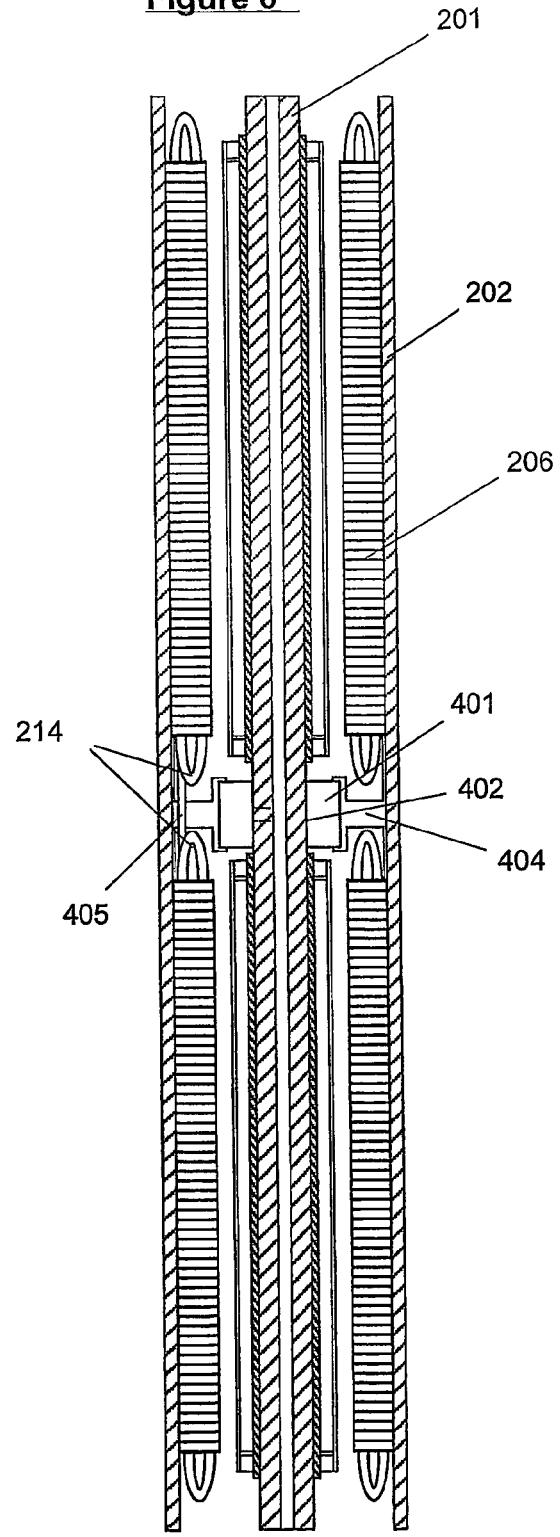
FIG. 6 illustrates an alternative construction of a motor stator in a housing.

Referring again to FIG. 5, the disclosure of the described embodiments has been based on a single wound stator. Commonly, for higher power, multiple housed motors are combined in series. FIG. 6 illustrates an embodiment in which two or more stator sections are accommodated within a single housing 202, in this case with one stator section per rotor section. The corresponding phase windings 214 of each stator section are connected in series while integrity of synchronicity of the sections is obtained by rotationally aligning the stator and rotor sections. The rotor sections are easily aligned on the shaft by keys. Disadvantageously, in a lap wound motor, the end turns will consume a large proportion of the overall motor length and the reliability will diminish in proportion to the extra end turns. Also, for a high speed motor, the distance between bearings will become large and possibly necessitate a larger number for shorter stages to maintain mechanical stability of the rotor. However, in the preferred embodiments disclosed above in which concentrated windings are used, the penalty for additional end turns is much reduced and the motor is feasible from reliability and performance points of view. In this case the practical advantages are the possibility of manufacturing a large variety of motor powers from a basic stator length and the relative ease of winding shorter stators.

The stator sections may be carried and aligned on a common mandrel for insertion in the motor housing 202, similarly to the foregoing descriptions for a single stator. The stator bore restrictions in which to house the bearings 401 are replaced by housings 404 concentric with the individual stator sections. Concentricity is maintained by the motor housing 202 when the entire assembly of bearing housings 404 and stator sections are inserted. The series connection 405 of the windings 214 of the stator sections is preferably achieved by permanent means such as brazing. The use of connectors, while possible, reduces reliability. It is a feature of the invention that winding before insertion permits these connections to be made and inspected beforehand.

High speed multi-pole PMSMs present a variable speed drive problem that the present invention addresses as described below. The origin of the problem is that the base electrical frequency that the drive must generate is the product of the number of motor pole pairs and the number of shaft revolutions per second. A standard induction motor having two poles and turning at 3600 rpm therefore has an electrical frequency of 60 Hz. A PMSM in accordance with the invention rotating above 4500 rpm has a much higher frequency. At 7200 rpm and six poles, the electrical frequency is 360 Hz. This six-fold increase is a step change in operating conditions for electric submersible pumping systems and well beyond the range of general industrial drives.

Figure 10:
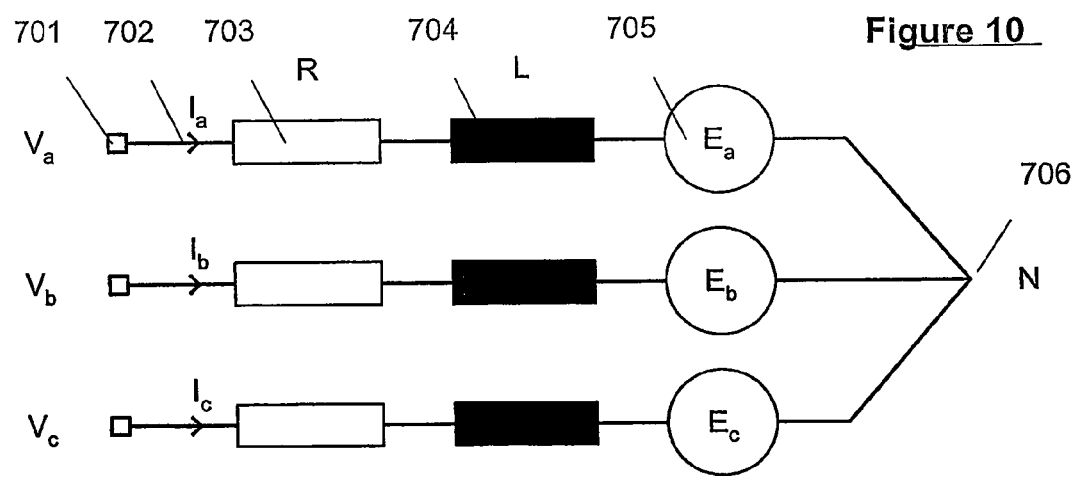
FIG. 10 illustrates a known electrical representation of a permanent magnet synchronous motor.

FIG. 10 shows a known electrical representation of a balanced PMSM with three phases a, b, c and isolated neutral. Referring to phase a, reference numeral 701 is a motor terminal to which the voltage $V_a$ is applied. Current $I_a$ indicated by the reference numeral 702 flows into the motor winding which has resistance R indicated at 703 and an effective inductance L indicated at 704. The effect of the permanent magnets rotating past the stator winding is to induce an electromotive force (EMF) $E_a$ indicated at 705. The other phases b and c may be described in the same way with appropriate substitution of indices. The three phases are joined together at the neutral point N indicated by the reference numeral 706.

It will be appreciated that multiple motors, or stators, may be connected electrically in series so that the resistances, inductances and EMFs add to make a single equivalent larger motor with a common shaft. Placing the terminals in parallel is also possible but poses difficulties in controlling currents between all the windings. More realistic motor models in which for example the EMF source and inductance are lumped together as an element that calculates the time rate of change of the internal flux linkage, and in which magnetic saturation is taken into account, are all refinements which do not affect the present invention. The number of phases, three, is well suited to the task of electric submersible pumping motors, but is not limiting.

Figure 11:
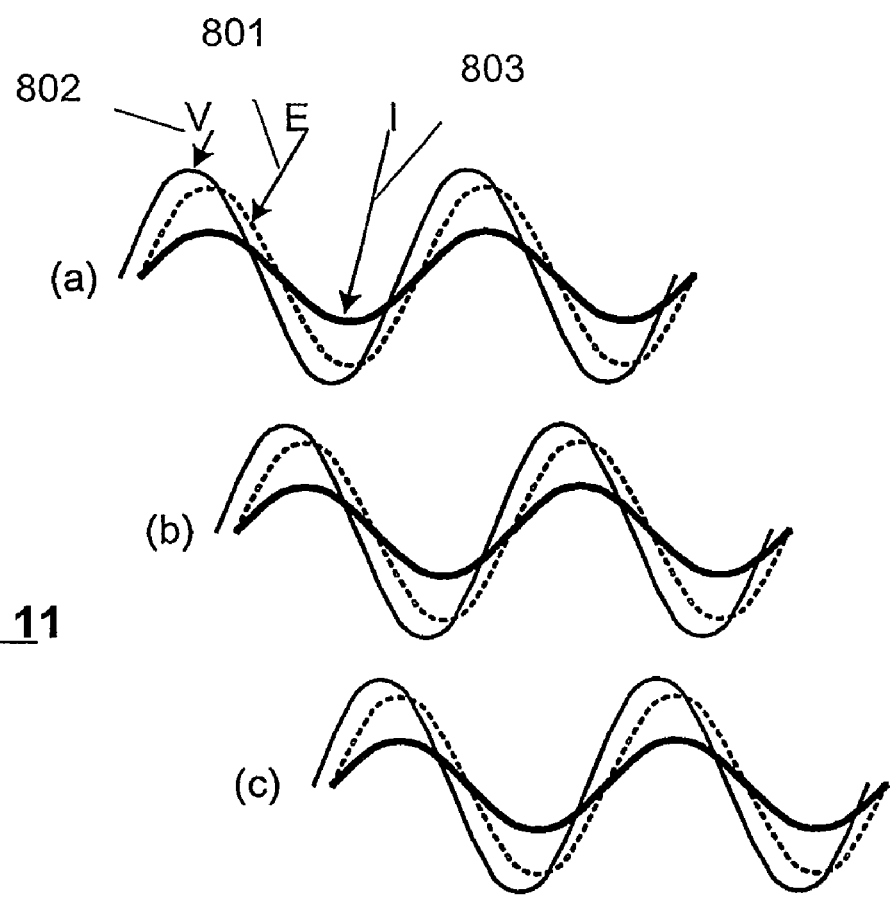
FIG. 11 shows the electrical waveforms of an idealised permanent magnet synchronous motor.

An idealised PMSM as described with reference to FIG. 10 produces sinusoidal EMF, with each phase 120 degrees apart, and is driven by a three-phase sinusoidal voltage source. FIG. 11 shows graphically how a sinusoidal voltage V, 802, applied to the motor with suitable amplitude and in the presence of the motor EMF E, 801, will result in a phase current I, 803. The source may also be current-controlled in which case V is the consequence of I and E.

The sinusoidal nature of the electrical quantities is ideally suited to the task of electric submersible pumping. This is because the smoothly varying waveforms do not cause damaging transients at the motor terminals, and because the motor torque can be shown to be constant with rotation, which reduces the likelihood of torsional vibration.

The construction of such a motor requires careful attention to the distribution of the turns of the windings within the stator slots. To produce a sinusoidal EMF with a reasonable number of slots cut in the laminations requires the turns from different phases to share slots and to be distributed among many slots. This immediately causes a reduction in reliability due to the potential for insulation failure in the many end-turn crossings and due to the mixed phases. There is also the loss of useful copper due to increased insulation between the phases.

Figure 13:
FIG. 13 shows the typical electromotive force of a trapezoidal-wound permanent magnet synchronous motor.

When the windings are made so that the phases are kept in separate slots, the back EMF will be more similar in form to E in FIG. 13. This is often referred to as a trapezoidal EMF. If the motor is driven with sinusoidal voltage or current the performance will not be as good as the ideal sinusoidal PMSM made with the same amount of copper in the windings.

Figure 14:
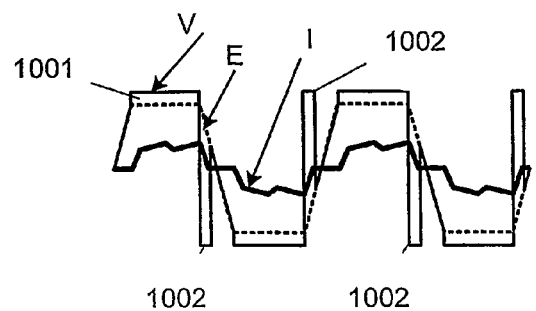
FIG. 14 shows the electrical waveforms of an idealised permanent magnet synchronous motor operated as a brushless DC motor.

FIG. 14 shows how a motor with trapezoidal EMF is driven, compared to the sinusoidal motor waveforms of FIG. 11. The key feature is that voltage is applied to the motor across two phases only at a time whereas in a sinusoidally driven motor voltage is applied to three phases at a time. The two-phase driven trapezoidal wound permanent magnet motor is commonly termed a brushless DC motor. The two phases are changed cyclically, as in AB, BC, CA, AB . . . . Whenever the phase pair is changed, one phase is electrically disconnected. Since there will be current in the phase winding, the terminal voltage exhibits a voltage flyback spike 1002, known as a commutation spike. These spikes occur twice per electrical cycle, on each phase. They present a serious limitation for the successful use of brushless DC motors in electric submersible pumping, since the voltage spikes lead to damaging electrical conditions on long cables, as hereinbefore described. The electric submersible pumping system of the present invention drives all three motor phases continuously such that damaging transients will not arise, without requiring the motor emf to be sinusoidal. It is convenient nevertheless to explain the principles in terms of sinusoidal waveforms, as the fundamental frequency component of the drive and motor electrical quantities predominate in a detailed analysis.

Figure 1A:
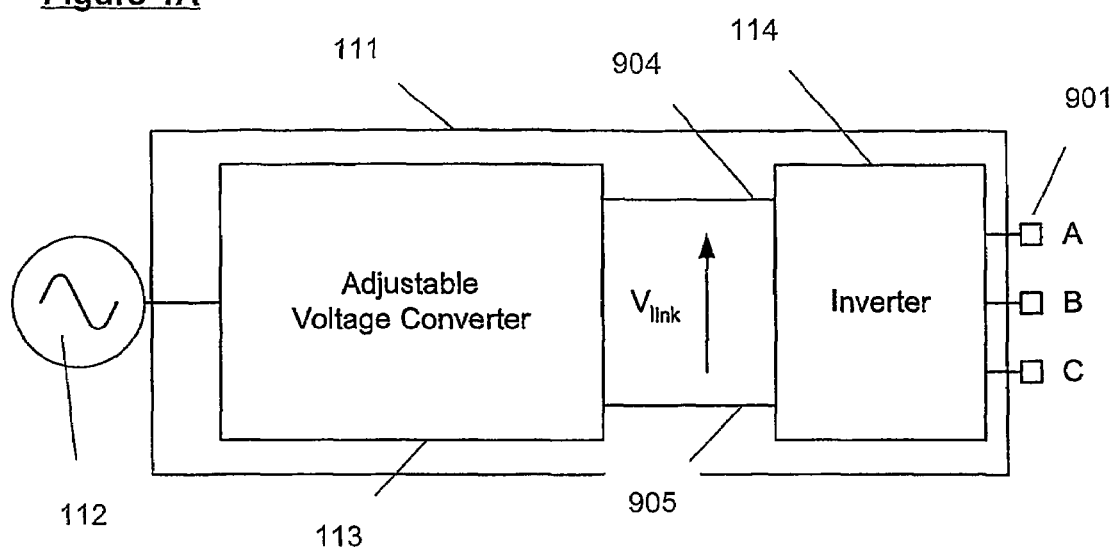

FIG. 1A shows a block diagram of a drive circuit 111 comprising an adjustable voltage converter 113 and an inverter 114 for supplying drive currents at output terminals 901 at the surface for supplying the three phases A, B and C of the motor via the power cable extending down the borehole. The inverter 114 is supplied with an upper voltage at 904 and a lower voltage at 905, the difference between the upper and lower voltages being commonly termed the link voltage.

Figure 12:
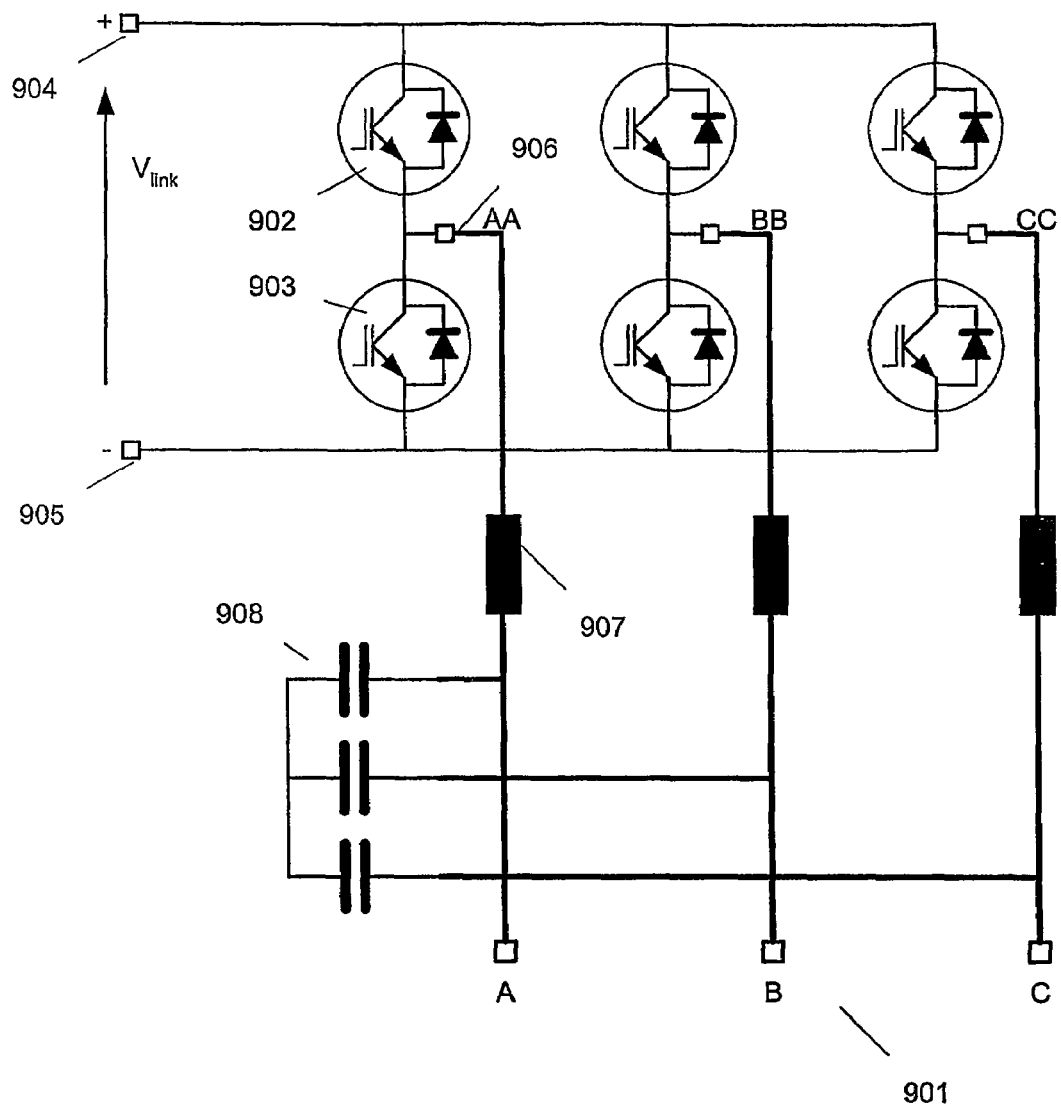
FIG. 12 shows a known electrical circuit diagram for the output stage of a variable speed drive.

FIG. 12 shows a schematic circuit diagram for the inverter 114 which is well known. For each phase output there is an upper switch and a lower switch, representatively shown for terminal AA at 906 as 902 and 903 respectively. By alternately turning on these switches, upper switch 902 on and lower switch 903 off or vice versa, this terminal may be sensibly connected to either the upper voltage 904 or the lower voltage 905. This arrangement is termed a two-level inverter. It will be appreciated by one versed in the art of inverter design that multi-level inverters may be made in which the terminals may be switched to voltage levels intermediate between the upper voltage and the lower voltage, such multi-level inverters being usable in alternative embodiments in accordance with the present invention. A filter is connected between the switch terminals AA, BB and CC and the drive terminals A, B, C at 901, representatively comprising inductors 907 and capacitors 908. The purpose of the filter is to smooth out the rapid switching transitions, and thereby present a smooth voltage to terminals A, B, C. It will be appreciated that other filters, for example for the removal of radio interference, may be added.

By contrast, in a brushless DC motor inverter, the filter is not present and the motor is connected directly to the terminals AA, BB and CC. Only two phases are active, that is only one switch is turned on, at a time, whilst the switches for the third phase both remain turned off as described above.

In driving of the motor in accordance with the present invention all three phase outputs are active at all times. In a sinusoidal variable speed drive it is necessary to use pulse-width modulation (PWM) or other switching modulation scheme known in the art, e.g. hysteretic, space vector, switching table, to create the effect of a sinusoidal output current. In the following description PWM drive is referred to by way of non-limiting illustration.

Figure 15:
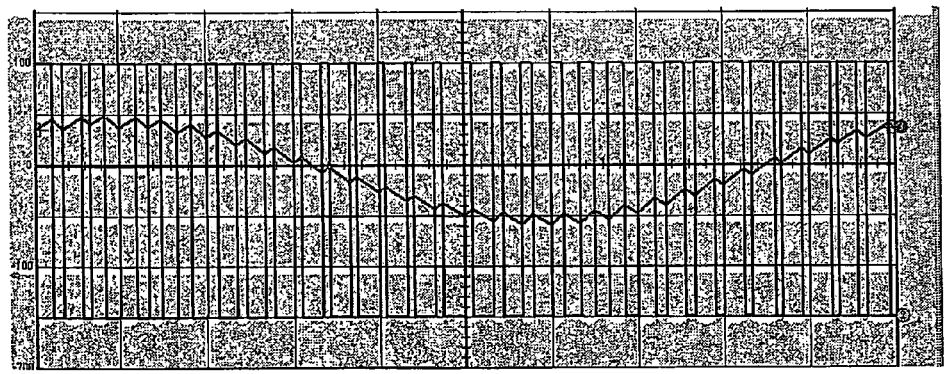
FIG. 15 shows representative waveforms of the variable speed drive of FIG. 12 for a motor when a variable output voltage or current is required.

FIG. 15 shows one phase of the output of a PWM drive according to which the upper and lower switches of a phase leg are alternated with a variable mark-space ratio. The voltage curve shows the switching at terminal AA, whereas the superimposed phase current curve is seen be sinusoidal with only a little ripple. Fourier analysis of the voltage would show it to have a predominant fundamental component at the phase frequency. Filter 907, 908 filters the voltage output of the drive circuit so that only the fundamental smooth voltage is passed to the power cable and thence to the downhole motor. This is therefore a suitable transient-free approach, in principle, for the PMSM submersible pump application However, to produce a high-power high-speed variable speed drive with sinusoidal output presents severe difficulties, as will now be described. The method is best suited to trapezoidal or similar EMF but is also applicable to sinusoidal driving, the difference being in the harmonic content of the waveforms and hence the best use of available power capacity.

The majority of variable speed drive circuits operate at typical utility supply voltages of 380 V AC-690 V AC, since the power semiconductors that they use for switches are well proven and efficient. However, just as in utility power transmission, for efficient motor operation using long power cables, it is necessary to use Medium Voltages, commonly in the range 1000 V AC-4000 V AC. Such voltages reduce the motor current and hence the ohmic losses in the cable. The majority of variable speed drive circuits for use with submersible pumps are therefore installed with a step-up transformer on the output. These transformers are a source of additional power loss, direct cost, and are often large and oil-filled, requiring special environmental precautions and substantial space. A wide speed range requires expensive core material for high speed but also a very large core to prevent magnetic saturation if operation at low speed is also required. They are in addition to input transformers, commonly required as described below to reduce harmonic distortion of the supply and to match to the available supply voltage.

A Medium Voltage drive circuit operates from a supply voltage directly at the voltage which is required for the motors. It therefore eliminates the undesirable output step-up transformer but has certain limitations for the purpose of high speed pumping.

Medium Voltage power semiconductors when used for the switches 902 and 903 of the drive circuit of FIG. 12 have large switching losses, i.e. unlike ideal switches they carry both current and voltage during the time it takes to open or close the path to current. The losses are inherently proportional to the number of switching operations per second. As an example, to turn on a switch at 3000 VDC assuming a current of 200 A might cause a loss of 1 J (Joule). If repeated 1000 times per second, the heat created would be 1000 W. It is easy to see that, once accumulated across all the switches of the drive, there would be a substantial cooling problem and loss of efficiency.

Figure 16:
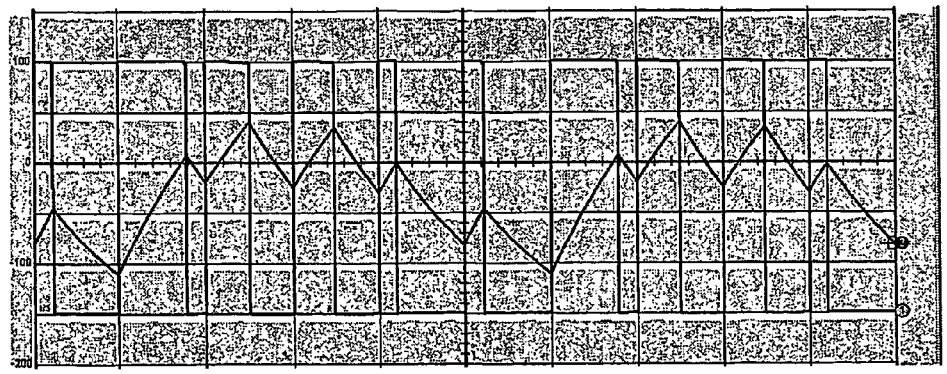
FIG. 16 shows representative waveforms of the variable speed drive of FIG. 12 for a motor when a variable output voltage or current is required, but with a low switching frequency.

To produce the quality sinusoidal waveform in FIG. 15, thirty switching cycles per fundamental motor frequency cycle were used. FIG. 16 shows the effect of reducing this to ten switching cycles per fundamental motor frequency cycle. The waveform is already of poor quality and difficult to filter.

With high speed multi-pole motors the switching speed becomes too high to be economic with Medium Voltage semiconductors. For example, a high speed motor with six poles operating at 7200 rpm has a fundamental frequency of 360 Hz, so that the drive should operate with a switching frequency of at least 3600 Hz just to achieve the quality of the response of FIG. 16, and preferably at least twice that. The normal range for Medium Voltage power semiconductors is 500-1000 Hz. This is why Medium Voltage drives for two-pole induction motors, which need a fundamental of 60 Hz at 3450 rpm, are typically specified at an upper fundamental of less than 90 Hz, far short of that needed for the high speed motors referred to above. If a lower voltage drive is considered as an alternative, then despite more efficient semiconductors, it too will reach a switching limit at high power. Moreover the step-up transformer has to be a more costly design as mentioned above.

Figure 19:
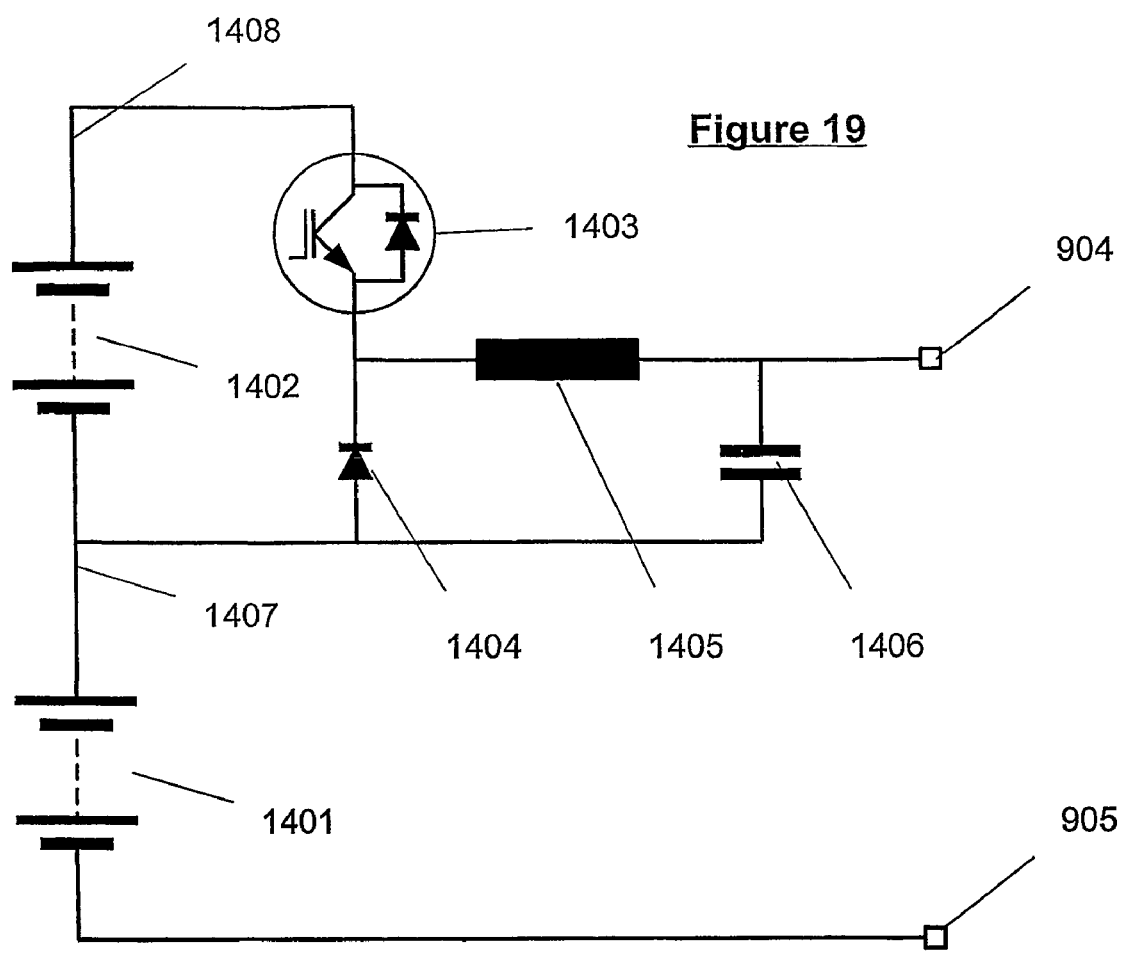
FIG. 19 shows an electrical circuit diagram providing efficient means for varying the speed of positive displacement pumps and centrifugal pumps, turbines and fans by varying the internal voltage of a variable speed drive.

The present invention overcomes these problems by deliberately over-modulating (non-linearly modulating) the output stage of FIG. 12 in conjunction with a variable voltage source such as shown in FIG. 19. Normally the PWM waveform in FIG. 15 may be used to produce a good sinusoidal waveform until the peak value exceeds $4/\pi$ times the internal drive voltage. If the depth of modulation is increased beyond this the PWM output will become distorted, that is the modulation will become non-linear, as shown in FIG. 17. This non-linearity is characteristic of any modulation scheme used for driving a motor in accordance with the present invention where the output voltage is unable to follow the peak of the sine wave or other waveshape that is demanded, in simple proportion. A particular case of over-modulation is to consider the peak voltage as fixed to the upper and lower levels of the internal drive voltage for substantial parts of each cycle, with pulse width or other modulation used to progressively vary the output between the upper and lower levels of the internal drive voltage for the remaining parts of the cycle. It is also possible, within the scope of the invention, to generate the waveform within the linear range of modulation, particularly at lower power levels.

The distorted switching waveform shown in FIG. 17 has several features. There are far fewer switching cycles than at lower modulation, and these are at the lowest-current intervals of the fundamental cycle. Switching losses will therefore be much reduced even if the switching frequency is kept high to facilitate filtering. The filtered output voltage, obtained, for example, by filtering the single phase in isolation, is quite similar to trapezoidal, and is transient free as required. When the filter is as shown in FIG. 12, it becomes a three-phase filter and the phase-phase voltage applied to the motor will be found to be even more smooth. The output is usable for sinusoidal motors, with some unwanted harmonics, and is well adapted to the non-sinusoidal windings of the preferred motors of the present invention.

Figure 21:
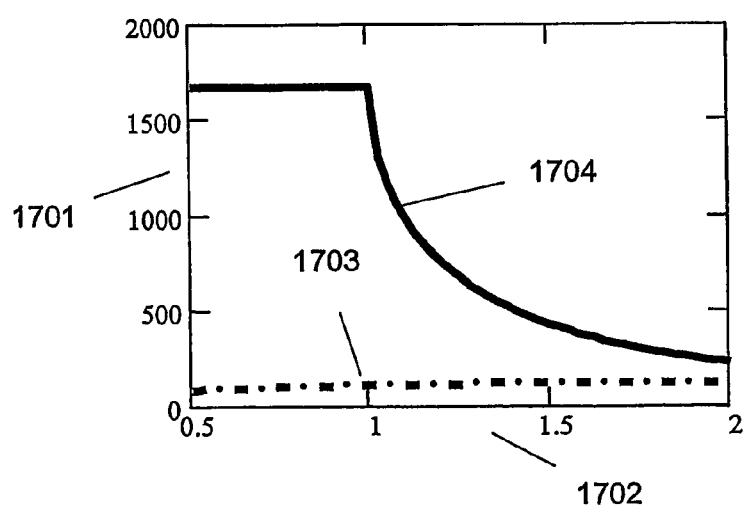
FIG. 21 illustrates the improvement in efficiency provided by a variable speed drive in accordance with the invention.

FIG. 21 shows the benefits of over-modulation more clearly. Horizontal axis 1702 is modulation depth normalised to $4/\pi$, and vertical axis 1701 is the heat loss of a typical switch. Curve 1703 shows the switch conduction loss, which is typically low for a submersible motor running at 100 A. Curve 1704 shows the switching loss. It is high for normal modulation levels, but reduces rapidly by a factor of three as over-modulation is increased. This represents a dramatic improvement and makes Medium Voltage drives of the present invention suited to high speed motors.

Since the amplitude of the drive voltage is fixed once over-modulation is employed, the only way of varying the motor voltage and hence the speed is to vary the internal drive voltage $V_{link}$ applied between the terminals 904 and 905 in FIG. 12 by means of the adjustable voltage converter 113. There are many known circuits to do this, including phase-controlled rectifiers and choppers.

However, the present invention seeks to make use of the special characteristics of the pumps it is powering, in order to further improve drive performance. In accordance with the power characteristic of centrifugal pumps as mentioned earlier and as depicted in FIG. 18, the power output at half speed is only 12.5% or so of the full speed power, and therefore of little interest in the well for which the motor and pump are specified. Similarly, though less dramatic, in a positive displacement pumping system the power will be proportional to speed and more than half power is normally required.

Therefore a properly specified drive can be assumed to be run most of the time above half speed.

A first embodiment of adjustable voltage converter 113 particular to the present invention incorporates a specially adapted variable voltage chopper source shown in FIG. 19 to provides an efficient means of regulating the internal drive voltage, and hence the motor speed, over the power range of interest.

In this circuit a first fixed supply voltage source 1401 is connected in series with a second fixed supply voltage source 1402, and a chopper, comprising a switch 1403, a diode 1404, an inductor 1405 and a capacitor 1406, is connected across the source 1402. By varying the duty cycle of the switch 1403, the voltage across the capacitor 1406 may be varied between zero and the fixed voltage of the source 1402. Since the voltage across the capacitor 1406 is in series with the fixed voltage of the source 1401, the voltage across the output terminals 904 and 905 may be varied from the fixed voltage of the source 1401 to the sum of the voltages of the sources 1401 and 1402.

When the motor is operating at low speed, as when starting and stopping, the power level and motor frequency will be low. Consequently conventional pulse width modulation by the drive output may be used with little penalty, with the chopper turned off, leaving the drive voltage fixed at the level of 1401. At full power output the chopper may be left permanently on. Therefore it has no switching losses in either case.

The switching losses of a chopper are proportional to switching frequency, input voltage and output current. The advantages of the arrangement shown are that the input voltage is only half that of the full supply, and that the frequency of chopping may be set independently of the motor speed since it is used to produce the link voltage and not the modulated drive output to the motor. For example, with a pump load and high speed corresponding to high power, the chopper might be operated at 500 Hz to limit switch losses, whereas the output stage in FIG. 12 may be switching, except when saturated, at 3600 Hz or more to produce a fundamental frequency of 360 Hz. If the conventional modulated PWM approach with a fixed internal supply were used, the output might have to be limited to 500 Hz, that is there would not even be one pulse per half cycle, resulting in an ineffective drive.

If a chopper were used across the full available supply voltage, the losses would be doubled as the switching voltage would be doubled while the switched current remained the same. This may be acceptable for lower power low cost drives where the dual fixed voltage supply 1401, 1402 is not implemented.

A further feature to optimise the drive, based on the characteristics of the electric submersible pump. is to vary the chopper frequency. Inductor 1405 is heavy, costly and has losses proportional to ripple current and average output current. As such it is an undesirable addition by comparison with conventional drives.

The inductance value is usually chosen to limit the chopper ripple current to a reasonable level. The ripple current is at a maximum when the chopper output is half its input voltage (50% duty cycle). At the same time, because of the nature of the pump load, the output power will be significantly reduced. Therefore at this condition the chopper frequency can be relatively high, permitting a lower inductance value. As the voltage increases the output power will increase, and the chopper frequency must be reduced to limit the switching losses. Since the ripple reduces as the output voltage increases (higher duty cycle) but increases as the frequency is reduced, it can be seen that a compromise profile of frequency versus power output can be found which allows a much smaller value of inductance than would otherwise be the case, reducing the adverse factors of weight, cost and power loss. It is quite reasonable to reduce the value by a factor of two, or four if the chopper is connected across the full supply and not a portion of it. Thus variation of the internal frequency of the adjustable voltage converter with output serves to improve efficiency and/or reduce the size of components.

Figure 20:
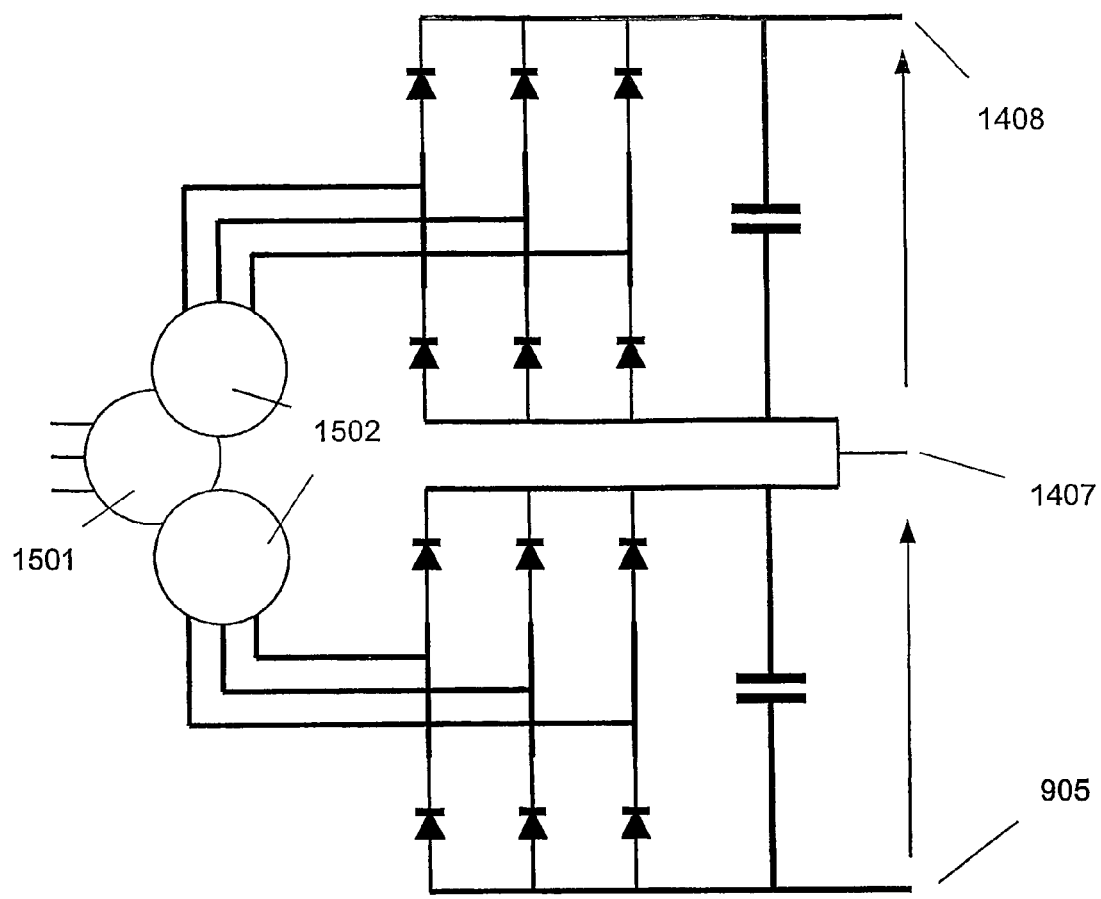
FIG. 20 illustrates a means of providing the supply voltages to a variable speed drive in accordance with the invention.

FIG. 20 shows a suitable circuit for the fixed voltage sources 1401 and 1402. In this circuit the utility supply is first transformed by a transformer 1501 having two secondary windings 1502, the output of each of which is fed to a three-phase rectifier and smoothing capacitor. The resulting DC supplies are connected in series. By altering the relative turns ratios so as to change the relative sizes of the voltages of the sources 1401 and 1402, the variable speed range of the supply may be adapted to particular requirements.

A particularly beneficial choice is when one secondary winding is wye-connected and the other secondary winding is delta-connected, and the turns ratios are adjusted such that the rectified outputs are equal. In this case the current pulses taken from the supply from one capacitor are displaced in time with respect to the current pulses taken from the other capacitor. This known arrangement is beneficial to the supply as the current pulses taken from the supply by the assembly occur twelve times per supply cycle and not six as when using a single rectifier. This substantially reduces the harmonic distortion imposed by the drive circuit on the utility supply.

A further embodiment of adjustable voltage converter 113 in accordance with the present invention incorporates a three-phase boost converter as shown in FIG. 35. This arrangement uses a two-level inverter as in FIG. 9, but operated so as to absorb power from the input terminals 3501, U, V, W which in this case are connected to the utility supply or a generator, and produce a voltage output between the terminals 905 and 904. This circuit arrangement and variations thereof can use a greater or lesser number of switches. Their use in industrial drives is mainly for four purposes, namely (a) to draw a sinusoidal current from the utility supply which improves the harmonic content, (b) to adjust the utility supply power factor, (c) to permit the regeneration of power from an over-running motor load to be returned to the utility supply, and (d) to provide a constant link voltage just above the maximum that would normally be obtained from an ordinary rectifier. The latter is also the minimum link voltage that can be used for the circuit to function with these purposes. In this embodiment the three-phase boost converter is used to produce a variable voltage between the minimum voltage level and a maximum voltage level that is above twice this level, and therefore provides a suitable adjustable range covering the main power levels of interest. A particular benefit for smaller submersible motors is that ordinary 380-480 VAC utility supplies can be boosted into the low Medium Voltage range, and therefore the Medium Voltage drives of this invention may be made without the cost of input transformers.

Other arrangements for efficient variable voltage are possible. If the fixed voltage sources 1401 and 1402 are kept separate and a chopper is placed across each, and the chopper outputs are connected in series, one chopper may be kept fully on or fully off which the other chopper varies its output. In this way the entire voltage range may be covered with only one chopper operating at less than the sum of the available supply voltage. It is also possible to connect the chopper across the fixed voltage source 1401 and to connect the fixed voltage source 1402 separately to the chopper output so as to add to it. Where the interference to the utility could be tolerated, one or both of the rectifiers in FIG. 20 could be rendered controllable by means of a thyristor bridge. Three-phase chopper circuit arrangements are known and can also be used.

It is desirable to dynamically control the drive, cable and motor arrangements to realise optimum efficiency. Unlike an induction motor a PMSM must be driven synchronously with its shaft rotation. With a brushless DC motor, for which two phases are driven at a time as hereinbefore described, there are numerous schemes to determine the shaft rotation without the use of rotation sensors (such as "Sensorless Vector and Direct Torque Control", 1998, P Vas, Oxford University Press) based on observing the effect of the voltage on the undriven phase. With a PMSM, because all three phases are continuously driven, the shaft rotation must be determined in another way. In a factory, a means is required to directly measure the instantaneous angular position of the rotor using a shaft sensor, such as a resolver or encoder, and to use the result to control the phase of the voltage or current output of the variable speed drive circuit. However, apart from the uncertain reliability of such transducers, the additional cabling or other means needed to transmit the position information from deep in the borehole to the variable speed drive circuit at the surface makes a sensorless technique almost certain to be required.

It is possible to control AC PMSM motors without sensors utilising a computerised or discrete component model of the motor, based on an electrical equivalent circuit as in FIG. 10 or a physics-based description, incorporating intimate knowledge of the motor's electromagnetic design. The model is kept supplied with terminal voltage, current and frequency information, which allows it to estimate the motor's internal variables such as rotor position. In turn these allow the control algorithm to decide how to adjust the drive output. These methods depend on an accurate model. Substantial effort is devoted to measuring the model parameters for a given motor before use, or by various monitoring means during operation. In the case of submersible motors, or in other applications where long cables are required, the cable resistance and reactance parameters must be incorporated into the model. Furthermore cable and motor parameters are subject to change with operating temperature and age. In the present invention it is shown how qualitative knowledge of the motor load characteristics may be introduced so as to refine the rotor position estimate for a PMSM without having to measure these uncertain system parameters. A general purpose drive is designed to cover a wide range of loads and dynamically varying conditions, as in a servo, and cannot assume particular properties of the load.

The characteristic of the load that is required for the feature of the invention now to be disclosed is that its power be steady for a steady speed. By averaging over a sufficiently long period random or short term load fluctuations can be accommodated. A submersible centrifugal pump, or a turbine, meets this condition.

Therefore, if the PMSM motor control is changed while keeping the frequency, and hence synchronous speed, constant, the load power will remain unchanged. The optimum control condition will be when the drive output power, which is measurable, is minimised. For example if a pump is turning at a fixed speed and takes 300 kW from the drive at one control condition, and 298 kW at another, then the second condition is more efficient as there is less power supplied, regardless of what the motor and cable parameters are thought to be and regardless of what the actual pump power is, since it has not changed.

Suitable means of effecting these control changes to find the most efficient system operating point are now disclosed. At constant speed the internal mechanical friction losses will be fixed, so that the dominant variable loss that needs to be reduced to a minimum by the control is the ohmic loss in the windings.

FIG. 22 shows the phasor diagram for the PMSM schematic shown in FIG. 10 and corresponding to the waveforms shown in FIG. 11. This diagram, which is known to those skilled in the art, refers to one phase of an ideal balanced motor with isolated neutral. The motor EMF amplitude E, denoted by the reference numeral 1801, is taken as reference. The phase current I lags behind this by an angle φ. The voltage drop due to the winding resistance 1802 and the voltage across the internal inductance 1804 sum as vectors to equal the driving voltage V denoted by the reference numeral 1805. The motor power output, ignoring internal mechanical and iron losses, is given by:

$$P = 3/2 EI \cos(\phi)$$

The EMF E depends to a good approximation only on the motor speed, so that, for fixed speed operation and since the output power is fixed by the load, the quantity I cos(φ) will be constant. The broken line 1806 shows the locus of constant output power. It is evident that minimum current, and hence least loss in the resistance of the copper winding, ≈$I^2R$, occurs when φ is zero.

In open-loop operation of the PMSM motor a given three-phase voltage or current is applied at a given frequency. The motor operates in accordance with the phasor diagram at an angle φ, satisfying the relationships between the parameters. Operation is at some non-zero φ, and as a result the motor is never optimally efficient. If φ increases beyond approximately ±45 degrees, the motor operation becomes unreliable since fluctuations in the load may increase the angle to the point where there is insufficient current available from the drive circuit to maintain the output power. At this point the motor will lose synchronism and stall. If the conditions are as shown in FIG. 22, then increasing the motor voltage will force φ to reduce and hence reduce the current and ohmic losses. It will eventually reach zero, the most efficient point, and then become negative, when the current and ohmic losses will increase again.

FIG. 23 shows this in terms of the input power 1902 of a representative motor plotted against terminal voltage 1901, normalised to the most efficient point of operation. The curve 1903 represents the average (real) input power and is the sum of the fixed motor output power and the copper losses. The curve 1904 represents the volt-ampere power, which includes a power factor. It can be seen that, by varying the input voltage, a point may be found which minimises whichever power quantity is desired. Increasing the normalised input voltage from below unity changes φ from positive through zero to negative.

Therefore the optimum operating point of the system at a given speed may be found by varying the input voltage independently of particular knowledge of the motor or cable parameters or actual load power. Since the motor output power demanded by the pump for constant pump speed and fluid type is constant, the control observable is the input power measurable at the surface. Parameters corresponding to the age or nature of the motor and/or cable are not required.

This method has broader applicability. For example, if a current-controlled drive is used, then current may be used as the control variable and the drive voltage and output power will vary as a consequence. Alternatively, for a fixed amplitude of voltage or current, the phase of this quantity relative to the estimated rotor angle could be slightly changed. In this case the optimum condition will be when the speed is maximised, since, from the characteristics of the load, increased speed corresponds to increased output power, and the maximum output power always occurs when φ reaches zero. (In FIG. 22, changing speed changes the reactance X and the emf E in proportion.)

Practically the above method is applicable to PMSMs without the simplified assumptions of FIG. 10, since the goal is simply least drive power for a fixed output power. It is preferably implemented as a long time average correction to an established closed-loop control, or as a slow adjustment for open-loop control, ensuring that load fluctuations do not cause false corrections. It will be evident to those skilled in the art of control theory that it is possible to merge the input power minimisation into an inner control loop, by weighting its importance to other error terms or using it as a constraint.

In this way the control loop keeps primary control over the range of φ that is permitted, while accepting a safe level of correction from the power-optimised control of the present invention. It should also be noted that, for real non-sinusoidal motors and drives, the issue of torque ripple can be important, and a lesser or greater amount of correction might be empirically added to keep this to an acceptable level. Such an arrangement is applicable to any synchronous motor with suitable load and thereby includes brushless DC motors and drives.

The improved winding and construction methods described above make it possible to further extend the reliability of the entire pumping system by means of cooperative duplication of failure prone electrical elements. The cost of replacing a failed system, and the loss of fluid production until the repair is complete, will far exceed the cost of the duplicate parts to be described.

FIG. 33 shows a variant installation according to which a single submerged motor 108 is connected to two electric power cables 110 and 110', each connected at the surface to a corresponding motor drive 111 or 111'. FIG. 34 diagrammatically shows the construction of the motor in the installation of FIG. 33 in which two sets of motor windings are provided, namely a first winding set 3001 connected to the cable 110 and a second winding set 3001' connected to the cable 110'. The motor is wound as a six-phase motor, divided into two sets 3001 and 3001' of three phases, each with its own neutral connection. The motor may either be driven as a six-phase motor to its full power capability, or alternatively as a three-phase motor using either set of windings at reduced power.

The advantage of such an arrangement is that failure of the cable 110 or its splices or connections, or of the drive circuit 111 or of any of the coils of the winding set 3001 will not affect any of the corresponding parts associated with the winding set 3001'. By using concentrated windings the windings of the phase sets may more easily be kept well insulated from one another than with lap windings. In the simplest case one coil per phase is wound over alternate teeth in twelve slots, the corresponding phases of each set being adjacent to one another. In this way the six motor leads exit the motor directly from their coils without crossing.

The above arrangement of six phases split into two sets of three phases, though having practical advantages, is not limiting. However two-phase motors still require three conductors in a cable, whereas motors with a larger number of phases require further cable conductors, which is undesirable.

A six-phase drive output circuit may be constructed by adding three extra pairs of switches to FIG. 9. The phases operate at a 60-degree separation, rather than 120 degrees. However, such a drive sold as a unit is complex and is substantially only useful for a fault tolerant application. The preferred embodiment uses two adapted three-phase drive circuits 111 and 111', with the adaptation being made by means of suitable signal and power connections 3002 between the drive circuits. The signal connections must ensure that the corresponding output phases of the drive circuits are 60 degrees apart. One drive circuit makes the rotor angle calculation to produce the master phase signal used by both drive circuits. To ensure smooth running across all of the phases, the amplitude of the drive output voltage must be the same on each phase. In the case of the high-speed drives disclosed in the present description, the terminals 904 and 905 of the drive circuits may be connected together so that their voltages are the same. One of many known power supply sharing methods may be used to equalise the power supplied by each chopper circuit.

In an alternative embodiment of the fault-tolerant pumping system, two motors are connected mechanically in series on a common shaft, but powered by separate cables and drives as before. The two motors may be operated individually or simultaneously. In the latter case the drive circuits must again be arranged to cooperate. This method is not applicable in the majority of wells as usually the motor diameter is the largest that can be fitted within the casing 103, and the motor cable 110 is fed past the pump and into the top of the motor 108 immediately below it. In such cases it is not possible to pass a second cable past this first motor to a further motor arranged at a deeper level.

The foregoing has assumed two duplicate motor sections that are identical, as that is the simplest fault tolerant arrangement. However, with suitable changes to the control and drive levels, a plurality of motor sections cables and drives of different characteristics may be used within the scope of the invention, so long as they are controlled to the same shaft speed.

The electric submersible pump system of the present invention has broad application, particularly in the field of downhole wellbore operations. Drilling for wellbore fluid at large depths is typically restricted to relatively narrow boreholes, so the facility of the present invention to provide the same motor power in a smaller overall package is immediately advantageous.

A further application of the present invention is to compress wellbore fluid in situ. It may sometimes not be required to immediately transport the wellbore fluid to the surface from its underground reservoir, but to compress it either for later recovery or merely to facilitate further exploration. Alternatively it may be required to transport the wellbore fluid from a first subterranean location to a second subterranean location, for the above reasons amongst others.

A recent development in mining operations is the application of multi-lateral wellbore systems in which a number of small diameter wellbores are drilled substantially horizontally from a central subterranean sump. Currently known pumping systems have significant difficulties in pumping from lateral wellbores, whereas the pump of the present invention can still maintain a high output in such environments. In this case, wellbore fluid is transported from the multiple lateral wellbores to the central sump, where it may be recovered to the surface or compressed as described above.

As hereinbefore described, an objective of the present invention is to provide a high-speed electric submersible pump, capable of operating at speeds above the current maximum of approximately 4,000 rpm. The standard operating speed of embodiments of the invention intended for the above applications is above 4,500 rpm, and an optimal speed, providing a marked improvement over current systems, is approximately 7,200 rpm.

The present invention discloses a permanent magnet synchronous motor submersible pumping system. It will be appreciated by the person skilled in the art that various modifications may be made to the above embodiments without departing from the scope of the invention.

Reference should also be made to "The Technology of Artificial Lift Methods", Vol. 2b, K. E. Brown, Penwell Publishing 1980, the contents of which are incorporated herein by reference.

The invention claimed is:

1. A downhole electric motor having at least three phases and comprising:
   a permanent magnet rotor; and
   a stator comprising:
      a laminated stator core having closed slots formed therein; and
      phase windings,
      wherein:
         the phase windings extend through the closed slots,
         each phase winding in incorporates a plurality of coils
            each coil extending through a respective pair of closed slots and surrounding a respective portion of the stator core between said pair of closed slots, adjacent coils of different phases extend through opposite parts of a respective one of said pair of closed slots, said adjacent coils are separated by a gap through which cooling fluid may be pumped to cool the coils, and by virtue of the conforming shape of said respective one of the closed slots, the coils are held in thermal contact with a thermally conductive projection integral with and projecting directly from the stator core and extending at least part of the way across said respective one of the closed slots.

2. A motor according to claim 1, wherein the stator incorporates nine windings extending through nine slots and consisting of three windings for each phase.

3. A motor according to claim 1, wherein the stator incorporates twelve windings extending through twelve slots and consisting of four windings for each phase.

4. A motor according to claim 1, wherein each slot is shaped to conform substantially to the cross-section of the corresponding coils.

5. A motor according to claim 1, wherein each of the coils comprises a plurality of coil sections fitted together to form a generally rectangular cross-section.

6. A motor according to claim 5, wherein each of the coil sections is encapsulated within a respective electrically insulating layer.

7. A motor according to claim 1, wherein each of the coils is encapsulated within a respective electrically insulating layer.

8. A motor according to claim 1, wherein the phase windings comprise preformed open ended conductive loops fitted within the stator slots and closed by subsequently applied conductive parts.

9. An electric submersible pump incorporating a downhole electric motor according to any preceding claim.

* * * * *

UNITED STATES PATENT AND TRADEMARK OFFICE
CERTIFICATE OF CORRECTION

PATENT NO. : 7,701,106 B2  Page 1 of 1
APPLICATION NO. : 10/562073
DATED : April 20, 2010
INVENTOR(S) : Yuratich It is certified that error appears in the above-identified patent and that said Letters Patent is hereby corrected as shown below:

In the Claims:

Column 28, Claim 1, Line 64, please delete "in".

Signed and Sealed this

Fourteenth Day of December, 2010

David J. Kappos
*Director of the United States Patent and Trademark Office*